US012659705B2

(12) United States Patent
Howard et al.

(10) Patent No.: US 12,659,705 B2
(45) Date of Patent: Jun. 16, 2026

(54) HUMAN-CENTRIC SMART BUILDING SYSTEMS AND METHODS

(71) Applicant: C Squared IP Holdings LLC, Scottsdale, AZ (US)

(72) Inventors: Kevin D. Howard, Mesa, AZ (US); Matthew J. Smith, Charleston, SC (US); James K. Holt, Sarasota, FL (US)

(73) Assignee: C SQUARED IP HOLDINGS LLC, Scottsdale, AZ (US)

( * ) Notice: Subject to any disclaimer, the term of this patent is extended or adjusted under 35 U.S.C. 154(b) by 478 days.

(21) Appl. No.: 18/136,243

(22) Filed: Apr. 18, 2023

(65) Prior Publication Data

US 2024/0357327 A1    Oct. 24, 2024

(51) Int. Cl.
| | |
|---|---|
| *H04W 4/33* | (2018.01) |
| *G08B 25/00* | (2006.01) |
| *H04W 4/02* | (2018.01) |
| *H04W 4/38* | (2018.01) |

(52) U.S. Cl.
CPC ............ *H04W 4/33* (2018.02); *G08B 25/006* (2013.01); *H04W 4/023* (2013.01); *H04W 4/38* (2018.02)

(58) Field of Classification Search
CPC ...................................................... H04W 4/33
USPC ...................................................... 455/456.1
See application file for complete search history.

(56) References Cited

U.S. PATENT DOCUMENTS

| | | | | |
|---|---|---|---|---|
| 12,260,737 | B1 * | 3/2025 | Bunker | ............... G08B 25/016 |
| 2015/0323915 | A1 * | 11/2015 | Warren | ................... G05B 15/02 |
| | | | | 700/275 |
| 2018/0020329 | A1 * | 1/2018 | Smith | ..................... H04W 4/08 |
| 2019/0158305 | A1 * | 5/2019 | Cui | .......................... F24F 11/58 |
| 2023/0045033 | A1 * | 2/2023 | Crolley | ................... G01S 19/14 |
| 2023/0119146 | A1 * | 4/2023 | Donegan | ................ G10L 15/22 |
| | | | | 340/540 |
| 2023/0199461 | A1 | 6/2023 | Allen | |
| 2023/0199462 | A1 | 6/2023 | Allen | |

OTHER PUBLICATIONS

Voas, Jeffrey, Networks of 'Things', NIST Special Publication 800-183, National Institute of Standards and Technology, Jul. 2016, 30 pages.

* cited by examiner

*Primary Examiner* — Qutbuddin Ghulamali
(74) *Attorney, Agent, or Firm* — Skaar Ulbrich Macari, P.A.

(57) ABSTRACT

The system and methods of the present invention use sensor hardware, software, and connectivity, both between sensors and with occupants of the commercial, private, or public building, for building service utilization and capacity optimization and for personal and mass safety. One or more clusters of different sensor types are deployed in an indoor setting and can be used to nurture, protect, and assist occupants of that indoor setting. The human-centric concepts herein are also shown to be applicable to both medical triage and transportation settings.

22 Claims, 21 Drawing Sheets

Conference Room
with Fixed and Movable Services

Use of Multi-Sensor Cluster Triangulation to Isolate AFib Victim Identified Using Face Recognition Custom Fire Exit
Routing Active Shooter Sightlines
296

Calculated Occupant Trap Areas
298

290

294

180

Emergency Exit Routing

Active Shooter Location and Sightlines
for Custom Avoidance Routing

350

Car/Taxi/Mobility Services

Ship/Boat/Barge

Bus/Truck/Van

Aircraft

Drone

Spacecraft

Railroad Train/Monorail/Subway/Elevated Railroad/Trolley

Multi-Modal Mobile Deployment

HUMAN-CENTRIC SMART BUILDING SYSTEMS AND METHODS

TECHNICAL FIELD

The present invention relates generally to smart buildings, and more particularly, to building service location determinations, optimum routing between occupants and building locations, safe building evacuations, optimum emergency response routing to locations within a building, and hazard and/or crowd avoidance.

BACKGROUND OF THE INVENTION

Conventional "smart buildings" are described primarily as a way to decrease building-owner operational expenses and risks, increase occupancy utilization, and enhance sustainability; that is, the focus has been primarily on managing and maintaining the buildings themselves. Although some thought was given to occupant satisfaction in the form of environmental controls (e.g., temperature, humidity, $CO_2$ levels) and lighting, there has been a lack of focus on the interaction of occupants with the commercial or public building's services, e.g., occupant routing to fixed building services (e.g., rest rooms, drinking fountains, medical supplies, fire extinguishers, meeting rooms, specific offices, and the like) or occupant routing to movable building services (e.g., food and/or alcohol bars in conference rooms, temporary cubicles and kiosks, transportable payment centers, and the like).

The capacities and current utilization of a commercial or public building's services are also not "known" by the building itself. There has been a lack of focus on the convenience of routing an occupant to any commercial or public building service in which capacity and utilization are of importance, such as a meeting area, an eating area, the nearest restroom that is not currently fully occupied, and the like.

Conventional technology has also not focused on using the detection of the location of occupants in a commercial or public building for safe building exiting or guidance for first responders inside the building in case of an emergency. Even when technologies that detect active shooters are part of a public building, there is currently no technology for an individual occupant to know the best way to escape harm and no technology for a smart building to assist routing for first responders.

Smart building technology is a booming business to enhance facility functioning. The global smart building market is expected to grow from about $80 billion in 2022 to over double that by 2029, according to industry forecasts. Unfortunately, current smart building technology uses hardware, software, and connectivity primarily for facilities management and building space optimization. As such, it is desirable to develop human-centric smart building technology to address the issues and deficiencies present with conventional smart buildings.

SUMMARY OF THE INVENTION

The system and methods of the present invention use sensor hardware, software, and connectivity, both between sensors and with occupants of the commercial or public building, for building service utilization and capacity optimization and for personal and mass safety, with a human-centric focus rather than the current building-centric focus of conventional systems. The core technology disclosed herein is the use of one or more clusters of different sensor types deployed in an indoor setting and used to monitor, nurture, protect, and assist occupants of that indoor setting.

Real-time locating systems (RTLS) were first shown by Tim Harrington, Jay Werb, and Bert Moore in 1998. They combined radio frequency identification (RFID) with viewing on a computer screen. This led to two primary models: the choke point and the relative location models. RTLS is a tagging system in which each object and/or person is tagged and can be followed or located. RTLS was presented as a solution for indoor use while global positioning systems (GPS) was seen as a solution for global and outdoor use. The vehicle routing problem for cars and trucks uses electronic street maps, a vehicle's current position via GPS, the destination, and various routing heuristics and metaheuristics to determine a path from one location to another location.

Various articles published by the National Institutes of Health have shown that AI-enabled sound-based diagnostic models such as convolutional neural networks (CNNs) can give high diagnostic accuracy (80-90%) for many sound-detectable medical conditions. CNNs learn how to diagnose various sound-detectable medical conditions using publicly accessible clinical sound records for atrial fibrillation, tachycardia, palpitations, cardiac arrests, asthma attacks, hyperventilation, bradypnea, hyperpnea, dyspnea, tachypnea, and Kussmaul breathing.

Although the standard measure of heart rate is beats per minute (normally between 60 and 100 bpm for an adult), the audio frequency of human heartbeats is between 20 and 500 hertz. Microphone technology, such as Canon's DM-E1 microphone, whose audio detection range is 50 to 16,000 hertz, and Shure's SM7B microphone, whose audio detection range is 50 to 20,000 hertz, is currently commercially available, which covers the bulk of the heartbeat audio frequency range.

It has been shown by both the military and law enforcement that it is possible to determine that a gunshot has occurred, using bullet bow-shock wave sounds (120 to 160 dB); the type of bullet that was fired, using the acoustic signature; and the gunshot location, using sound propagation timings to multiple omnidirectional acoustic sensors. Although most gunshot detection systems are designed for outdoor use, such as the Army's PILAR system or DARPA's Boomerang counter-sniper system, there are several indoor gunshot detection systems, such as Trinity Sound technology and the Guardian Shot Detection system. Although an indoor gunshot detection system indicates where the gunshot originated on a map of the building in question, automatic shooter sightline determination and avoidance routing, either real-time or simulated, are not part of existing systems as a smart building service.

Infrared fire detection sensors have been on the market for many years. However, the most sophisticated systems are only used for industrial applications like the detection of $CO_2$, hydrocarbon, and other specialty fires. What is not discussed in the literature is the use of an array of infrared sensors to not only detect a fire's location but also to determine the propagation rate and direction of indoor fires in order to determine the safe building exit routes.

The present invention significantly expands conventional building management-centric concepts of a smart building to include the human-centric concepts of wellness, human safety, occupant and first-responder support, and real-time customized routing strategies. The system and methods described herein use a variety of sensors and sensor clusters and mobile device technology for monitoring and customized routing of the occupants of a commercial or public building to specific-use services, both fixed and movable, based on current utilization and the maximum capacity of various building services, and for customized emergency routing. In the case of an occupant experiencing a sensor-detectable personal emergency, such as cardiac arrhythmias or respiratory distress, a customized routing to the distressed occupant is generated and presented to either building personnel and/or first responders. In the case of a mass emergency within the building, such as fire, an active shooter, or an earthquake, customized routing of the building's occupants out of harm's way is generated.

The systems of the present invention comprise (1) GPS-enabled sensor clusters containing network-connected acoustic, optical, infrared, RFID, and radar sensors; (2) maps with GPS coordinates for commercial and public building services; and (3) one or more mobile device applications for building occupants to locate and route occupants to building services and emergency exits. An array of sensor clusters can be used to detect various cardiac and respiratory medical distress events and various mass emergencies, such as fires or active shooters. The sensor cluster is connected to a computer system for processing, using a stand-alone server, cloud-computing, network-based servers, or compute capability with the sensor cluster itself, stand-alone, peer-to-peer or ad hoc processing, in order to process the data and generate customized routing upon request or customized routing in case of an emergency.

DETAILED DESCRIPTION OF PREFERRED EMBODIMENTS

Figure 1:
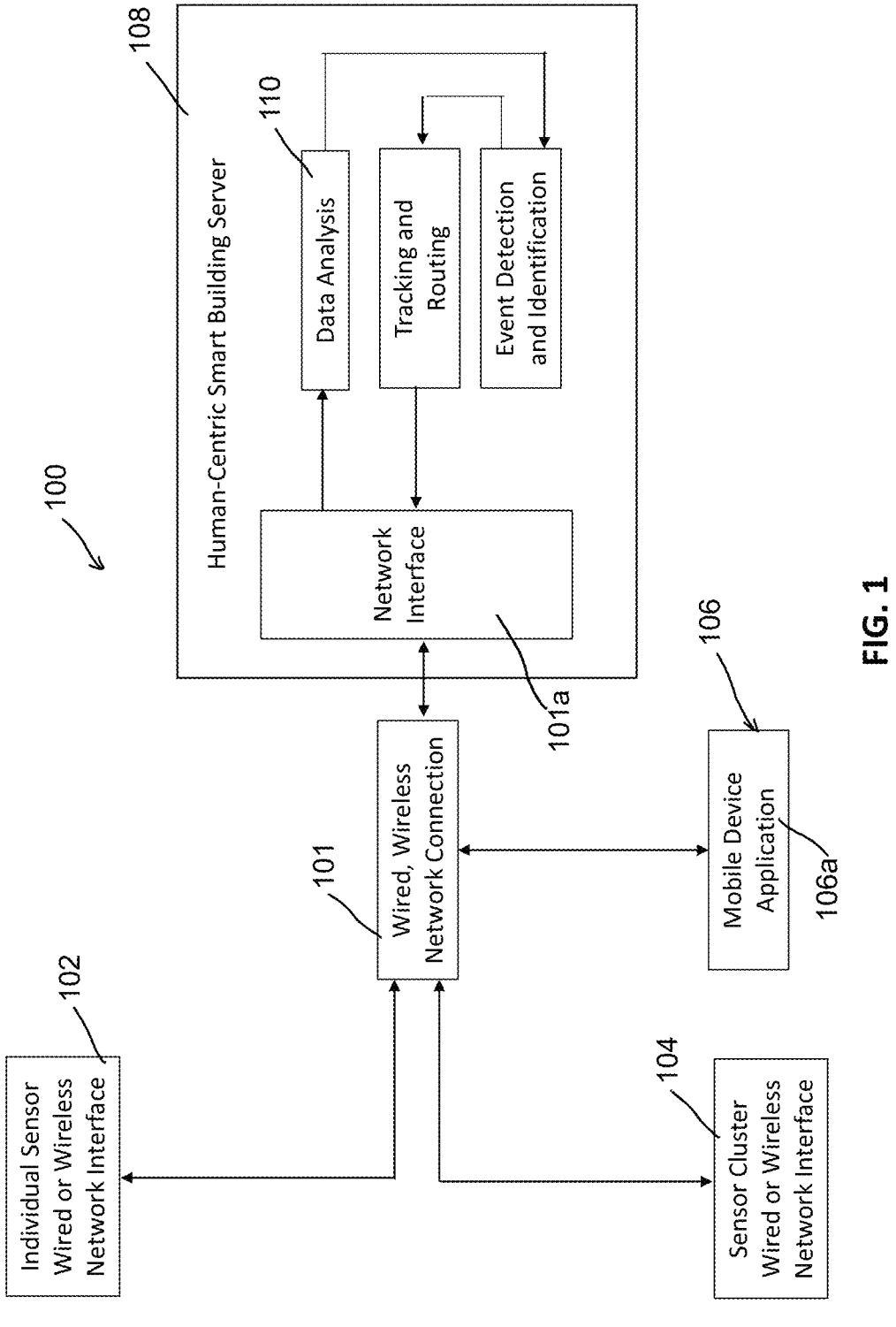
FIG. 1 shows a diagram of the primary software of a human-centric smart building system. The software is directly associated with mobile devices, sensors and sensor clusters, and computer server hardware networked and used within a commercial or public building, in accordance with embodiments of the present invention.

FIG. 1 shows an example system 100 of the present invention, comprising a network connection 101, a network interface 101*a*, a network of sensors 102, sensor clusters 104, mobile devices (or wearables) 106, and computer servers 108. Modern sensors that are gimbal-mounted can automatically track targets and send a continuous stream of target data to the server as long as a target is detectable. The target data is then analyzed at component 110 for the presence of new events, such as the sensor-detected presence or absence of occupants utilizing building services, medical emergencies, water, fires, weapons, gunshots, earthquakes, property damage, partial or complete building collapses, and other events that can be placed on a building map.

Non-sensor-detected events, such as mobile device application sign-ins, smart in-building routing requests, occupant location requests, building services requests, and mobile device current position data, are detectable via an occupant's mobile device 106 using the human-centric smart building application 106a.

Multiple data streams from sensor-detected events and from occupant information and requests are fused to enable higher-order activity to be determined and displayed to an occupant or to a first responder. The location and status of an occupant experiencing medical distress can be determined from fusing data such as cardiac or breathing distress detection, face recognition, and building map data. Knowing the direction a particular occupant is looking in can be determined with face tracking from optical sensors and location information from an associated mobile device or using triangulation data. An active shooter's sightline can be determined using correlated occupant data and gunshot location on a building map. Customized safe fire-escape routes can be determined using occupant location data and heat maps from an array of infrared detectors.

Building information is made available to occupants via their mobile device 106, allowing for customized information to be received from or delivered to an occupant. Correlation of face recognition with particular occupants allows the system to correctly identify who is in a medical emergency or who is a shooter, even if they move locations or dispose of weapons. Correlation of information like gunshots with a particular occupant also allows the building to automatically block information access to any mobile device associated with an active shooter.

Figure 2:
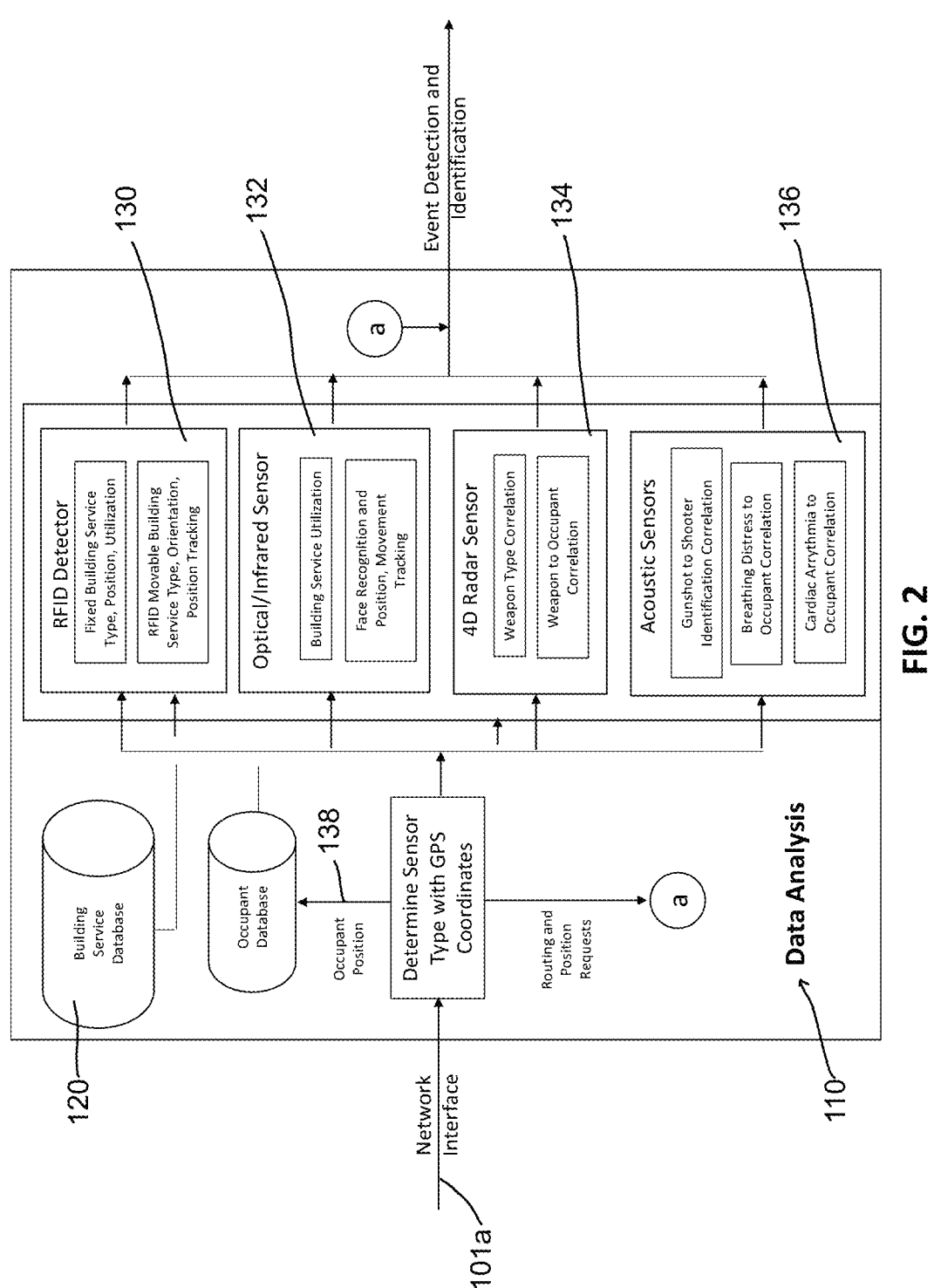
FIG. 2 shows a diagram of the software of the data analysis component of a human-centric smart building server. Various analytical components are shown that detect building service usage, position, occupant movement, occupant health, occupant requests, and the like, in accordance with embodiments of the present invention.

FIG. 2 shows an example of the types of data analysis performed by the system 100. Since fixed building services can be known ahead of time, a database 120 of fixed services like restrooms, drinking fountains, offices, dining areas, exits, stairs, elevators, escalators, conference rooms, recreational facilities and the like can be created and stored, which includes information such as service name, type, service capacity, availability, current service utilization, and GPS position. Data is fed via the network interface 101a for analysis to determine the sensor type with GPS coordinates at component 110.

In various embodiments, the data analysis system 110 can include one or more radio frequency identification (RFID) detectors 130, one or more optical/infrared sensors 132, one or more 4D radar sensors 134, and one or more acoustic sensors 136.

The database entries for movable building services must also contain multiple RFID tags 130 per movable building service with the tag information of head, tail, front, back, top and bottom to determine the position and orientation of a movable building service. Combining this RFID tag data with building maps and occupant positions 138, the human-centric smart building can automatically route an occupant to a moveable building service. Combining the movable building services position, orientation, and type with an occupant's position 138 and face positioning (e.g., via sensors 132) allows for the automatic determination of certain movable building service utilization.

Sensor-detected medical distress correlated with an occupant's position 138 allows for the smart routing of first responder or building personal to the occupant in distress. Similarly, the detection and correlation of gunshots to a particular occupant allows for the smart routing of first responders to the shooter or the smart routing away from the shooter. In either case, the identity of the occupant in distress or the active shooter can be automatically determined using face recognition analysis via sensors 132.

Figure 3:
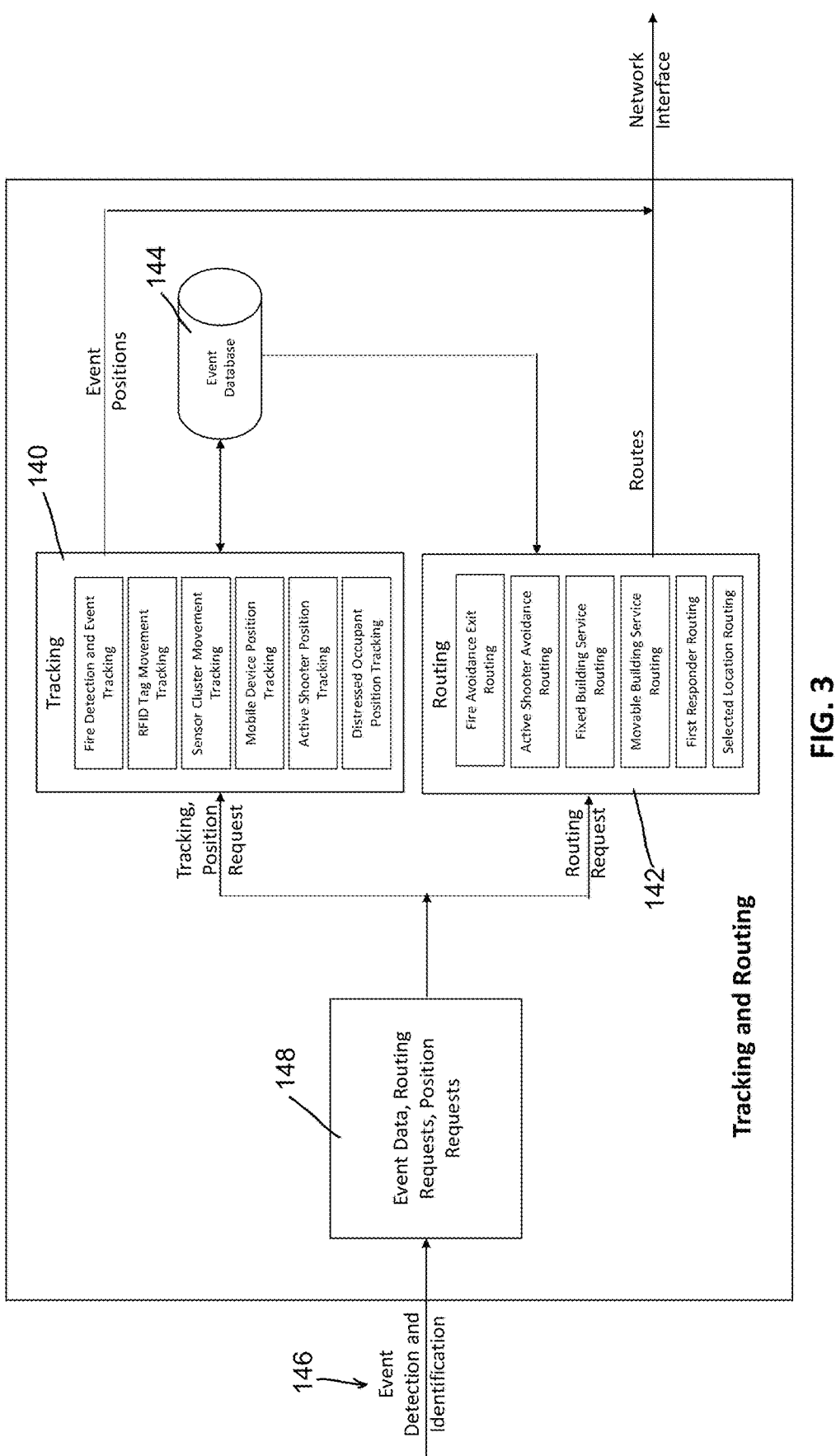
FIG. 3 shows a diagram of the software of the tracking and routing component of a human-centric smart building server, in accordance with embodiments of the present invention. Various types of tracking and routing functions used by the system are shown.

FIG. 3 shows an example of the types of tracking and routing performed by the system 100. The tracking and routing components 140, 142 of the system are in operative communication with one or more event databases 144. Event detection and identification 146 communicates event data, routing requests, and position requests to component 148. The output from component 148 is communicated to the tracking component 140 and the routing component 142.

In case of fire detection, data analysis generates a series of heat maps, from which the system calculates the intensity, location, and direction and speed of propagation of the fire (e.g., via component 140). This allows for the system to generate a customized building exit strategy for each occupant as a function of data on the fire and the location of all building occupants and all available exits.

Building movement and building partial or complete collapse can be automatically determined using detected movement of the GPS chip-enabled sensor clusters. Since the sensor clusters form an array, relative position changes of the arrayed sensor clusters indicate building movement or building collapse events via component 140. When the location of building collapse events are automatically placed on a map of the building, the system generates customized routing, taking collapses into consideration via component 142.

Face recognition can be used to track an occupant's building location, even if they have no associated mobile device, tag, or badge. Weapon possession or medical distress detection can be correlated with a particular occupant, and their location automatically tracked via component 140. This allows the building to give first responders the quickest route to a distressed person or to an active shooter and the building to route occupants away from any active shooter via component 142.

Figure 4:
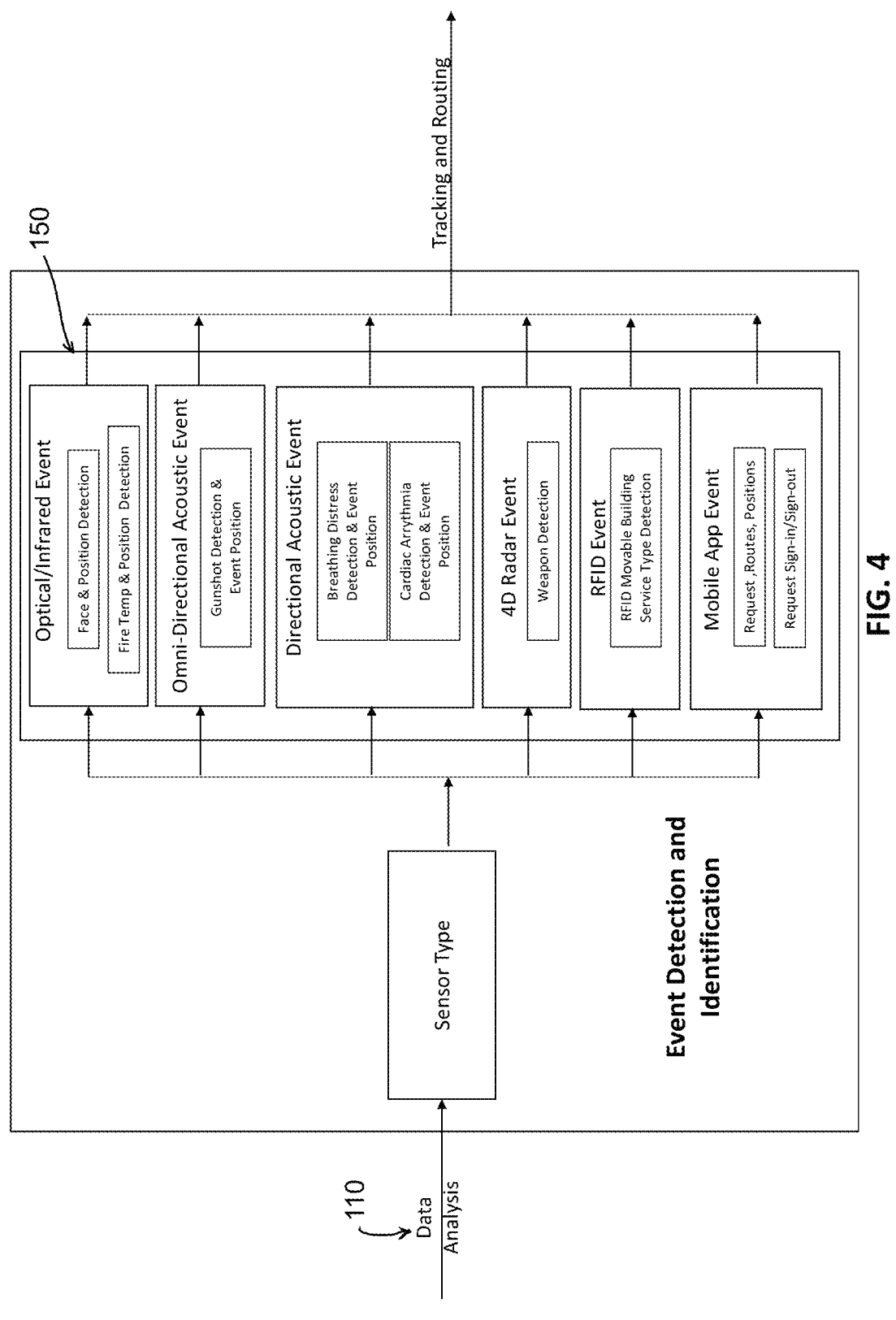
FIG. 4 shows a diagram of the software of the event detection and identification component of a human-centric smart building server, in accordance with embodiments of the present invention. Events as varied as gunshot detection, health distress detection, and face detection are processed. Events are also identified.

FIG. 4 shows an example of the types of events 150 (e.g., optical/infrared event, omni-directional acoustic event, directional acoustic event, 4D radar event, RFID event, and mobile app event) that can be detected and identified by the system 100. These events include a human face, changes in building service utilization, changes in movable building service position and/or orientation, requests for routes, requests for building service positions, building movement, fire, a gunshot, a weapon, breathing distress, cardiac arrhythmia, etc. In order for an occupant to make custom use of human-centric smart building services, they are required to sign in and sign out of the mobile device application 106a. Both sign-ins and sing-outs are also events to the system 100.

Figure 5:
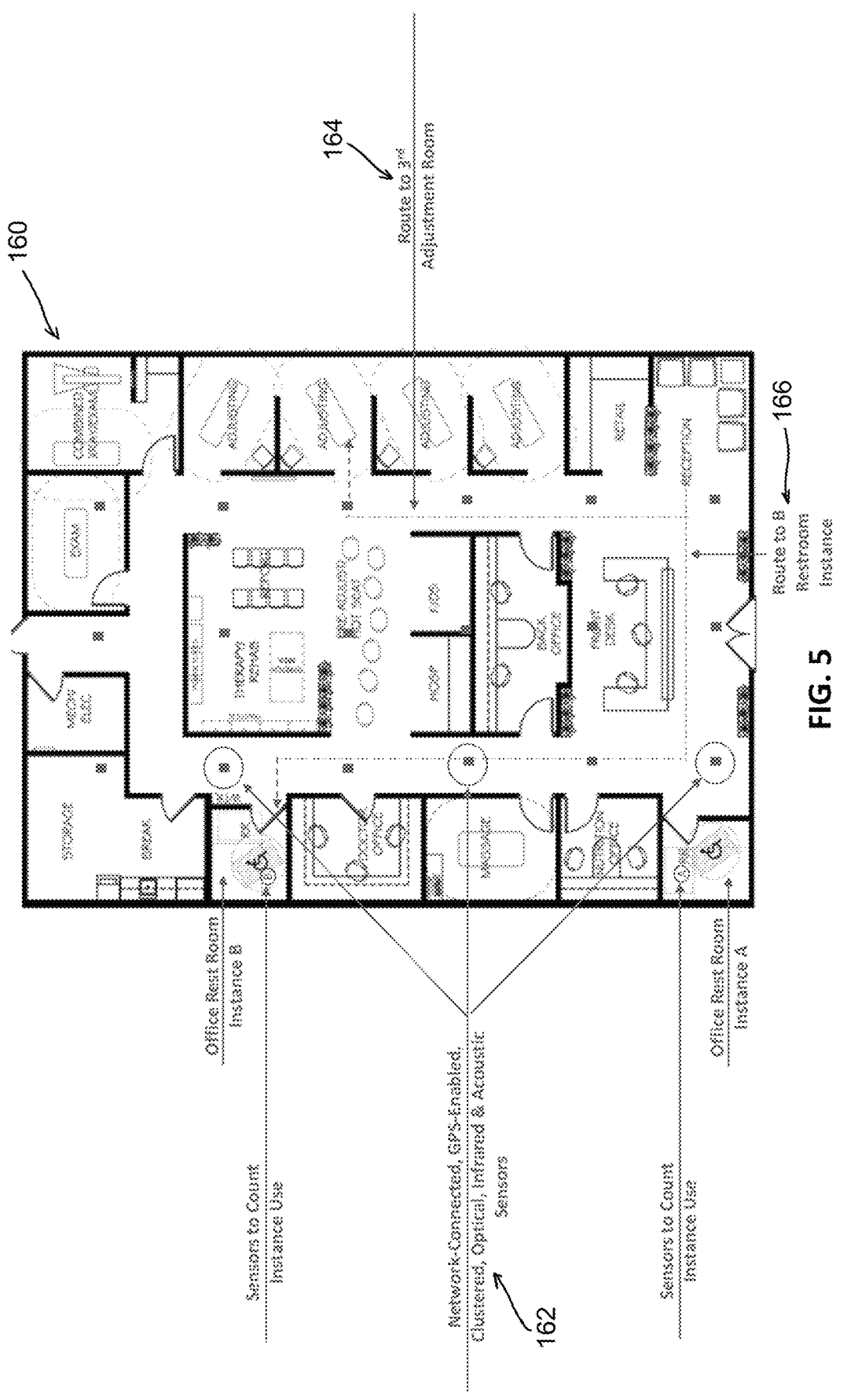
FIG. 5 shows a diagram of both automatic building routing to a particular office and the automatic selection and routing to a particular bathroom instance when there is a known instance capacity, using a sensor to determine the utilization, in accordance with embodiments of the present invention. The location of GPS-enabled infrared and acoustic sensors is also shown.

FIG. 5 shows an example diagram 160 of an array of network-connected, GPS-enabled clusters 162 of infrared, optical, and acoustic sensors. Since each cluster of sensors 162 has its own GPS chip and is connected via a network (wireless or wired) to a computing system, it is possible to determine the relative positions of sensor-detected occupants to the various sensors 102 in the array. This allows for the automatic tracking of sensor-detected occupants throughout the building, without the need to attach identification technology, such as RFID, to the tracked occupants.

The diagram 160 shows the automatic routing on a building map display 162 that is shown to an occupant upon request using the human-centric smart building mobile device application 106*a*. Shown is a route 164 for an occupant to an office in a building and another route 166 for an occupant to the nearest available restroom. Other routing determinations and mappings are also envisioned for implementation with the present invention.

If there are multiple instances of particular facilities, such as restrooms (identified as family and other), the system 100 uses entrance/exit sensors to count the number of people at a particular facility instance. If there is a capacity associated with the facility instance, then the system automatically determines the location of a facility instance with capacity and routes the occupant to that instance.

Figure 6:
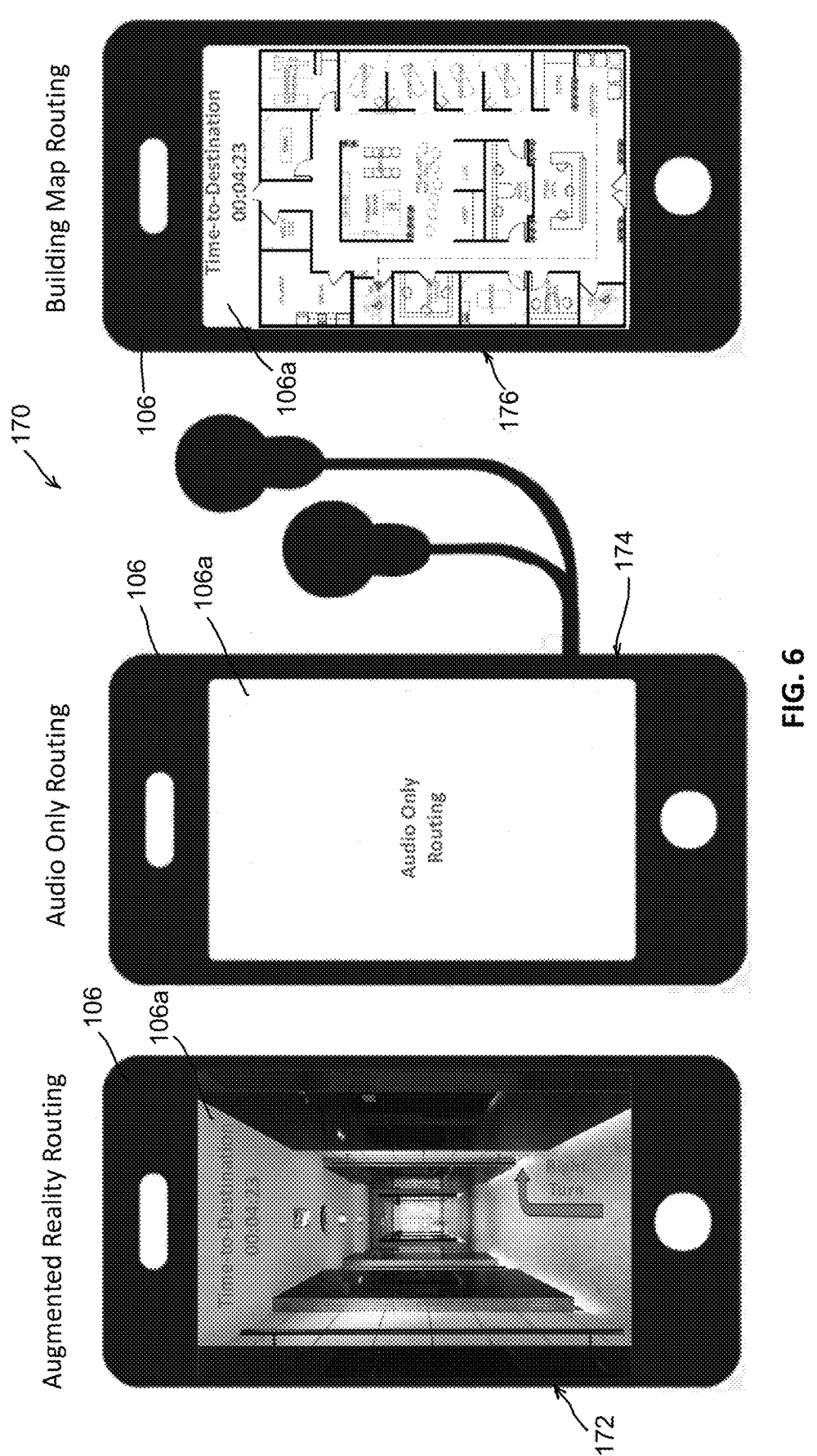
FIG. 6 shows an image diagram depicting an occupant's routing on a mobile device showing augmented reality, audio only, and a map version of in-building routing, using the human-centric smart building mobile device application, in accordance with embodiments of the present invention.

FIG. 6 shows an example diagram 170 of three modes available on the human-centric smart building mobile device application 106*a* to route an occupant to a restroom, for example, in a building, upon request. The first mode 172 is an augmented reality display, which overlays an actual image from the camera of the occupant's mobile device with the routing to destination information. The second mode 174 indicates that routing directions will be given audibly with no display. This is useful when in a light sensitive area such as a movie theater. The third mode 176 shows routing displayed on a two-dimensional map of the current floor of a building and corresponds to standard map-based routing displays used for vehicles. The map-based routing, like the augmented reality routing, shows a time-to-destination.

Figure 7:
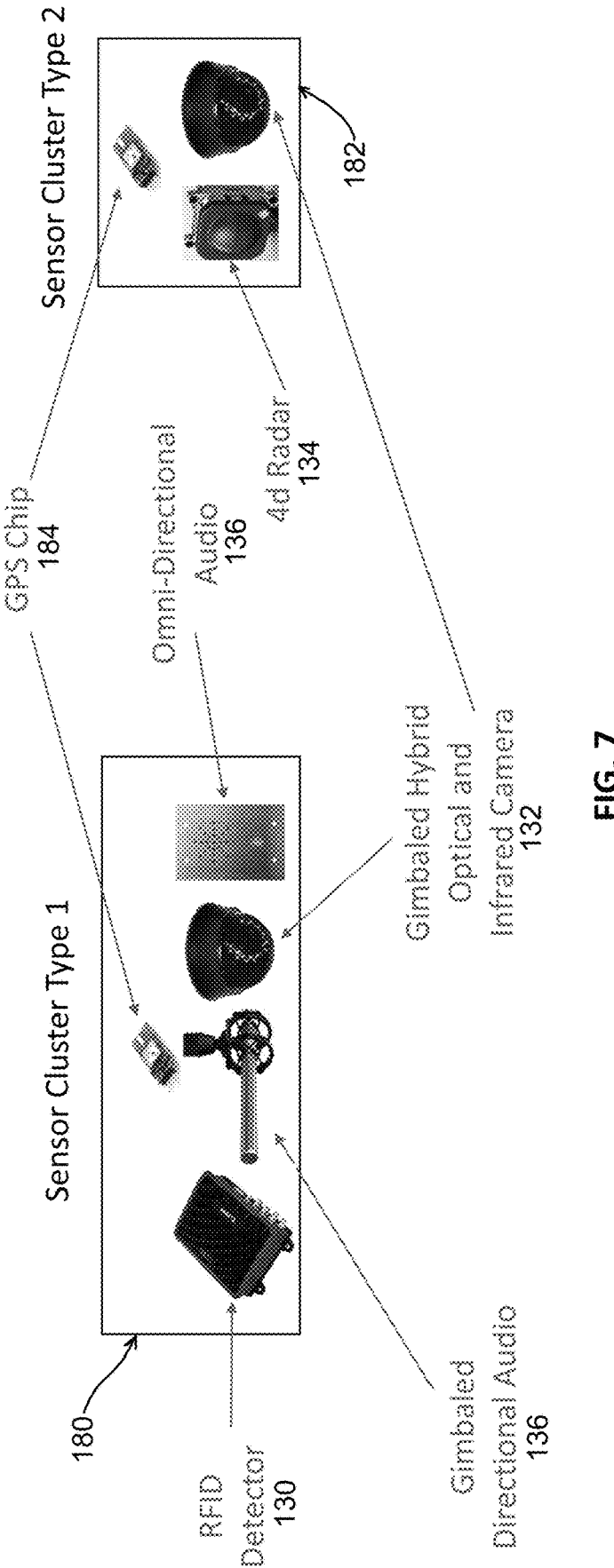
FIG. 7 shows an image diagram of a cluster of gimbaled directional-audio, omnidirectional-audio, and gimbaled hybrid optical and infrared camera sensors as discussed herein, in accordance with embodiments of the present invention. It also shows another cluster of 4D radar and optical sensors.

FIG. 7 shows an example of two sensor clusters: a cluster 180 including RFID 130, infrared 132, optical 132, and acoustic sensors 136 and another cluster 182 including 4D radar 134 and optical sensors 132. A GPS chip or device 184 is included with each cluster 180, 182. As shown, there are two types of acoustic sensors: directional and omnidirectional. The directional acoustic sensor allows for the isolation of sound to a narrow detection aperture, automatically eliminating noise outside of the detection aperture. This is for the acoustic detection of low amplitude signals that might have a narrow frequency range, requiring more sensitive detection capabilities, like human heartbeats and/or human breaths. The omnidirectional acoustic sensor is useful for detection of broadband acoustic signals like gunshots. The infrared detector is useful for determining the location and temperature of a fire.

The 4D radar 134 is used by the system 100 to generate an image of items on an occupant. This image is compared to a database of weapons, including various gun types, knife types, and truncheons. Once a weapon is detected, the optical sensor with associated face recognition software is engaged and the face of the weapon-associated occupant is stored. Storing the face enables the system 100 to automatically track the location of the armed occupants within the building.

Figure 8:
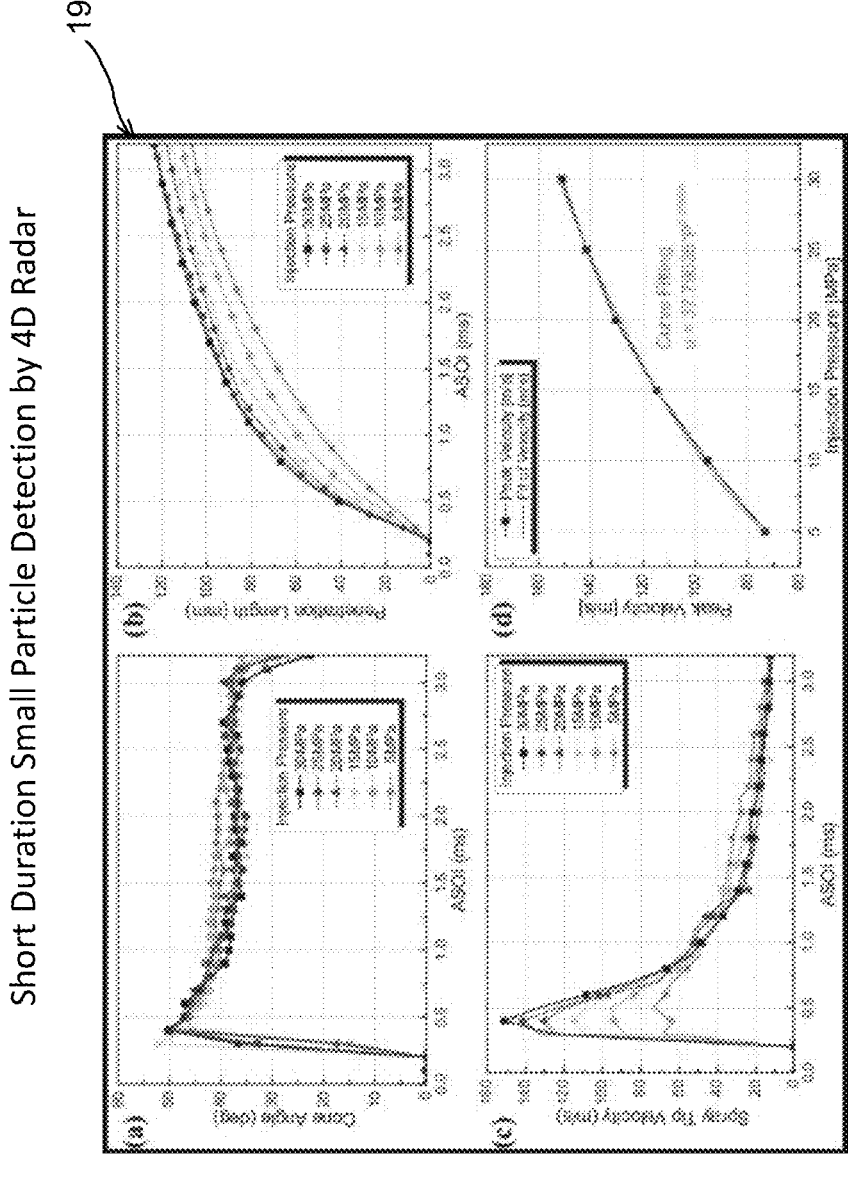
FIG. 8 shows a diagram of the detection by 4D radar of small, fast-moving particles in an enclosed area, in accordance with embodiments of the present invention.

FIG. 8 shows a diagram 190 depicting the ability of a chip-based 4D radar 134 to detect and analyze small particles in an enclosed space. This is important as it shows that the sensitivity and accuracy of chip-based 4D radars is enough to detect heartbeats and respiratory events, offering an additional method for human distress detection.

Figure 9:
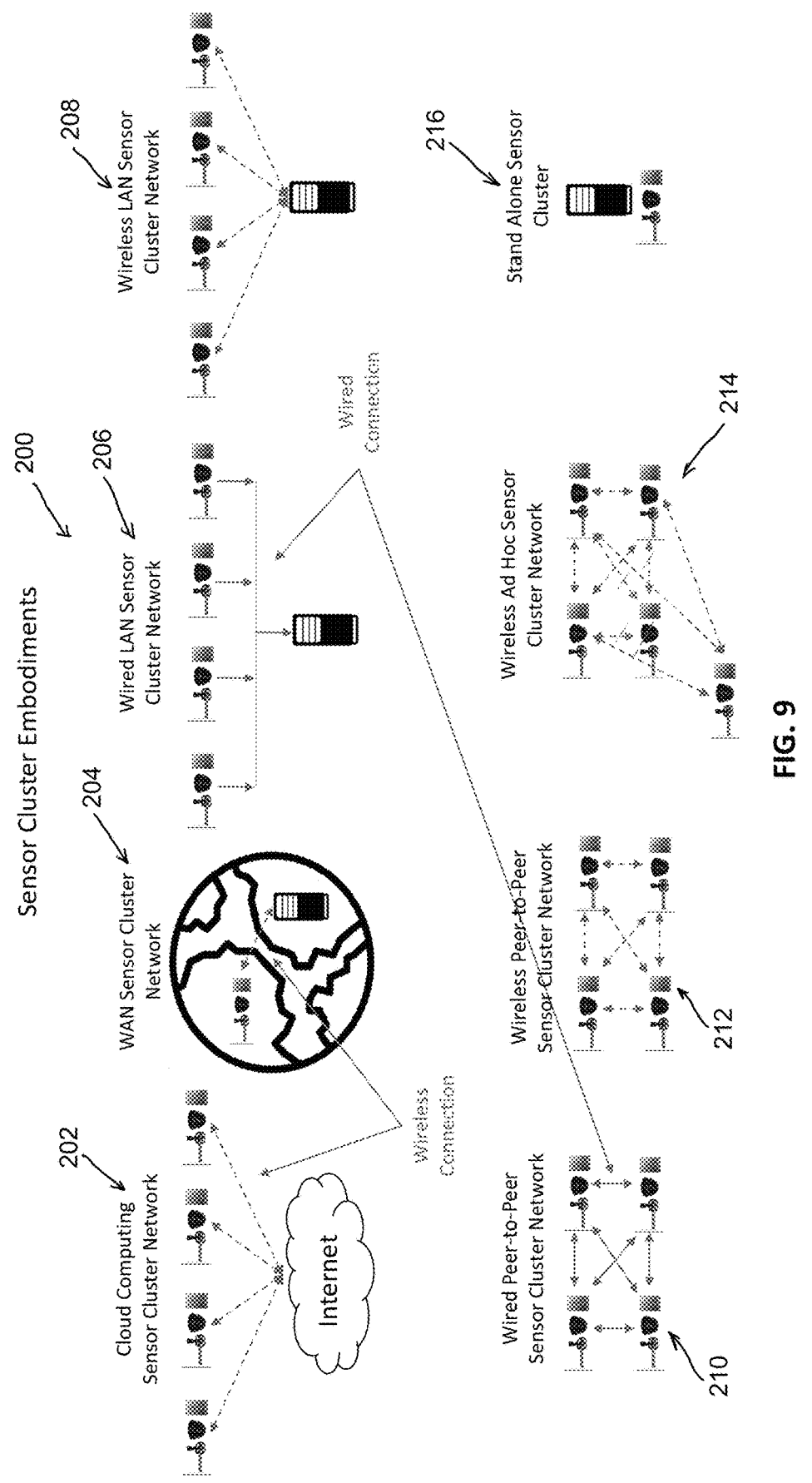
FIG. 9 shows a diagram of various embodiments of clustered sensor deployments as well as clustered sensor networking and a single stand-alone clustered sensor deployment method, in accordance with embodiments of the present invention.

FIG. 9 shows a diagram 200 of example sensor cluster deployments that can be used by the system of the present invention: cloud computing 202, wide-area network 204, wired local-area network 206, wireless local-area network

208, wired peer-to-peer network 210, wireless peer-to-peer network 212, ad-hoc network 214, and stand alone 216.

There are two primary connection models for sensors, sensor clusters, servers, and networks: with internet access and without internet access.

The internet model uses cloud computing servers to process sensor data with the internet access via either wired or wireless methods. The general internet access model can be used to connect multiple sensor clusters together forming an array of sensor clusters without geographic boundaries via the internet. The information from the various sensor clusters is then processed and stored using internet-based computational and storage facilities (e.g., cloud computing and cloud storage). The processed information can then be used by building occupants as disclosed herein. The basic requirements are sensor clusters attached to the internet, a cloud server, cloud storage, cloud processing front-end software, cloud storage front-end software, cloud back-end sensor processing, and mobile device application software. Taking building sensor information, processing it using cloud computing and then accessing the stored processed information via a mobile device application, represents a type of internet-of-things (IoT) technology.

A cloud computing-based sensor cluster array embodiment 202 allows information from multiple sets of arrays of sensor clusters to be processed and the information shared in a global setting. This allows global scale organizations the ability to provide global scale services to multiple geographically dispersed human-centric smart buildings. An occupant moving from one building to another controlled by the same or federated organizations could do so using face recognition and site data to allow for easy-to-use multi-location occupant use of building services. An occupant's identity is secured away from any particular building site increasing their security for building service use. This is particularly important in a crisis situation where physical passes (keys, cards, mobile devices, etc.) could be lost or stolen. Using a cloud-computing data processing model 202 also eliminates the need for sensor computation at any particular location, thereby decreasing the computational electrical requirements at that location. If the location is isolated, has low electrical power access, or if the security at the site of a building is not deemed sufficient to store occupant privilege information, then a cloud-computing embodiment offers multi-level security and instant simultaneous privilege revocation or granting to all building site locations around the world.

When there is either a single building site or the building sites are reasonably close together, then non-cloud-computing data processing solutions can be used. There are at least five ways to deploy the system 100 of the present invention without the need for internet-based cloud computing: using networked server-based client-server models linking computer servers to sensor cluster clients 206, 208; peer-to-peer network models whereby computational resources found at each sensor cluster work together (parallel processing) to process sensor cluster data 210, 212; sensor cluster ad hoc networks where sensor clusters can be arbitrarily added or removed and whereby the computational resources found at each sensor cluster work together (parallel processing) to process sensor cluster data 214; mobile device ad hoc networks whereby the computational resources of in range mobile devices work together (parallel processing) to process sensor cluster data 214; and using a stand-alone sensor cluster with or without a server 216. Each of these five embodiments could be deployed as either a wired system or a wireless system. Neither the peer-to-peer network nor the two ad hoc network models, by definition, use a server.

Each of the above-described embodiments that can be set up as part of the human-centric smart building system 100 as a wired system can use either high power or low power. It is possible to construct a network consisting of an array of sensor clusters and either a computer server or the use of a network computer model (e.g., peer-to-peer or ad hoc) using physical cables. A high power wired system uses cables such as twisted pair and coaxial. A low power wired system uses cables such as ethernet, optical fiber, patch cables, and power lines. The wired network model represents an instance of a network-of-things (NOT), as defined in NIST SP-800-183 by Jeffrey M. Voas on Jul. 28, 2016, rather than an instance of an IoT.

The wired local area network (LAN) computing-based sensor cluster array embodiment 206 is designed for single building use and provides for single building nurture, protection, and assistance. This embodiment is for those locations where the sensor clusters are fixed as part of a building. This solution requires separate, network-attached computer servers that are attached to the same local area network as the sensor clusters. A wired peer-to-peer network computing-based sensor cluster array embodiment 210 is also designed for a single building use. Unlike the wired LAN solution, this solution eliminates the need for separate server computers or data center by having the processing occur using the embedded computing capability of each networked sensor cluster in the array either apart (e.g., each sensor cluster contains enough computer processing power to process all sensor cluster data) or in parallel (e.g., when the number of sensor clusters detecting events is less than the total number of sensor clusters and the computer processing power of a given sensor cluster is insufficient to process its data).

Each of the above-described embodiments can be set up as part of a human-centric smart building system as a wireless system using either high power or low power methods. Wireless wide area networks (WANs) are considered high power solutions. WAN-based sensor cluster array embodiments 204 offer analogous capability to cloud computing but on a much smaller scale: the ability to offer building services across multiple buildings in multiple building sites in a town or city. This embodiment is for large geographically dispersed, multi-site organizations within a city.

A wireless LAN is usually considered to be a low power solution. A LAN computing-based sensor cluster array embodiment is designed for single building use. Unlike the wired LAN embodiment, this solution can be added after building construction, meaning an existing building can be quickly retrofitted to have the capabilities associated with the system 100 of the present invention. Like the wired LAN model, the low-power network wireless models represent an instance of a NoT. There are various low-power short-range wireless data communication methods: Bluetooth, WiFi, ZigBee, ultra-wide ban, and infrared.

Bluetooth is a master-slave system whereby a fixed location master device which sends a radio frequency signal asking for a response from any slave device within range of the master device's signal. The slaves respond and synchronize their transmit/receive timings with the master device by aligning their hop frequency and clocks to the master device. Bluetooth networks operate in the frequency range of 2.402-2.480 GHz or 2.4-2.4835 GHz and are typically small, containing two to eight devices including the master device. The data rate range of the typical Bluetooth sub-model is 1-3

Mbits/s, limiting the amount of data transmitted from a sensor cluster. Bluetooth is designed to generate wireless personal area networks (WPANs) that could be used with sensor clusters for temporary solutions to room-sized human-centric smart building problems.

Wi-Fi is a family of network protocols based on the IEEE 802.11 family of communication protocols. The frequencies used are broken up into multiple transmission bands, each of which has multiple channels. These bands are 900-928 MHz, 2.4-2.5 GHZ, 5-5.9 GHZ, and 60-61.5 GHZ, depending on the country of the location's regulations. Because of the frequency bands used, line-of-sight tends to be the limit, making it most useful for unblocked, single room human-centric smart building problems. Since its range is much larger than Bluetooth class sensors, Wi-Fi can be used in stadium, theater, or other large room or facility settings. Data transfer rates can exceed 1 Gbit/s and there is no inherent device limit. This solution can be used for both LANs and WANs.

Zigbee is based on IEEE 802.15.4 communication protocols and assumes low power, low data rates, and close proximity. Like Bluetooth, it was defined to create WPANs, but unlike Bluetooth or Wi-Fi, Zigbee is designed to be very simple and useful for such low-data items as light switches, temperature control, and other low data rate items. The frequency ranges used are 2.4-2.4835 GHZ, 902-928 MHz, and 868-868.6 MHz. Transmission range is ten to twenty meters. There are only sixteen channels, so both the number of devices and the transmission rate per device is limited. Zigbee can only be used in a small room, temporary solution environment where sensor clusters only need to transmit small amounts of data. Networks whereby the sensor cluster processes all sensor data and only needs to transmit small amounts of solution data can use this protocol.

A wireless peer-to-peer network computing-based sensor cluster array embodiment 212 is designed for a single building and the building's immediate environment. Like the wired peer-to-peer network computing-based embodiment 210, this solution eliminates the need for network-attached servers.

Unlike other embodiments, the ad-hoc network computing-based sensor cluster array embodiment 214 uses only the computational capability found within each sensor cluster. As mentioned above, there are two types of ad-hoc networks: sensor cluster and mobile device. For sensor cluster ad hoc networks, the various sensor clusters are tied together using proximity and a wireless connection. Computer processing comes from combining the computational resources of the sensor cluster using parallel processing. As sensor clusters are added or removed, the network automatically compensates for changes in available computing resources. For mobile device ad hoc networks, the computer processing needed for the sensor data comes from combining the computational resources of any mobile device within range using parallel processing. Data is shared by the ad-hoc network and an application on the mobile device for display to the occupant.

The stand-alone embodiment 216 is not a network but could serve as a node in an ad-hoc network if put into proximity with other sensor clusters. The processing is performed using the computational resources of the sensor cluster. Like the ad-hoc embodiment, a mobile device 106 with a display entering the range of a stand-alone sensor cluster is treated as an addition to that sensor cluster's network. Data is then shared by the sensor cluster and an application on the mobile device 106 for display to the occupant.

Figure 10:
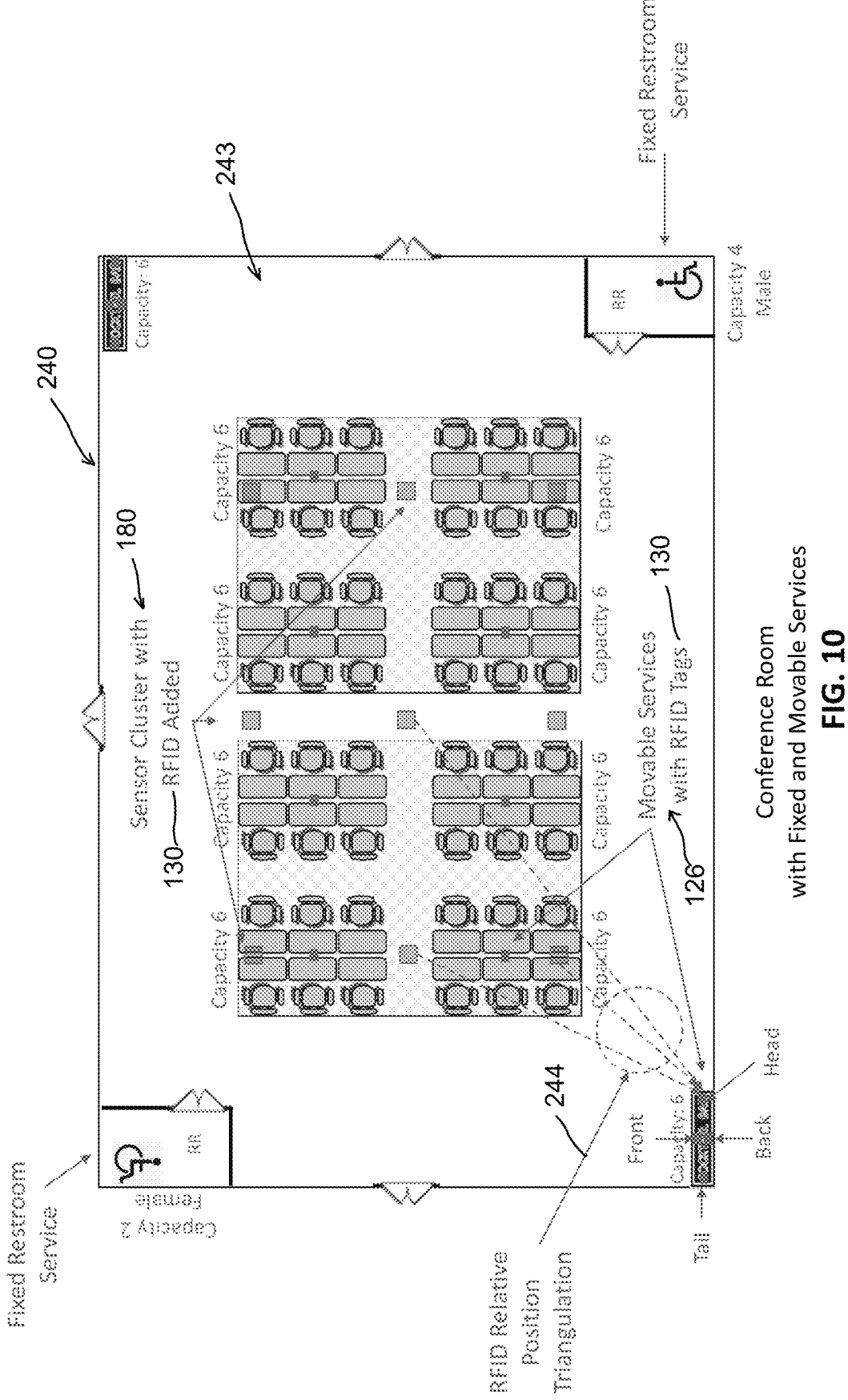
FIG. 10 shows a diagram of radio frequency identification (RFID) sensor placement to triangulate the actual positions of moveable building services for use in routing occupants to those services, in accordance with embodiments of the present invention.

FIG. 10 shows a diagram 240 depicting an array of clustered sensors 180 which include RFID sensors 130. The RFID sensors 130 are shown triangulating the position of RFID-tagged movable building services 126 with associated occupant capacities (in this case, movable alcohol bars) within a conference room 243. The triangulation 244 gives the relative position of the movable building service 126 to the GPS-enabled sensor clusters 180, producing an actual GPS position for the service 126. The calculated actual GPS position of the movable building service 126 is then used by an occupant-held mobile device 106 to route a building occupant from their current location to the nearest requested movable building service 126 that has capacity.

Figure 11:
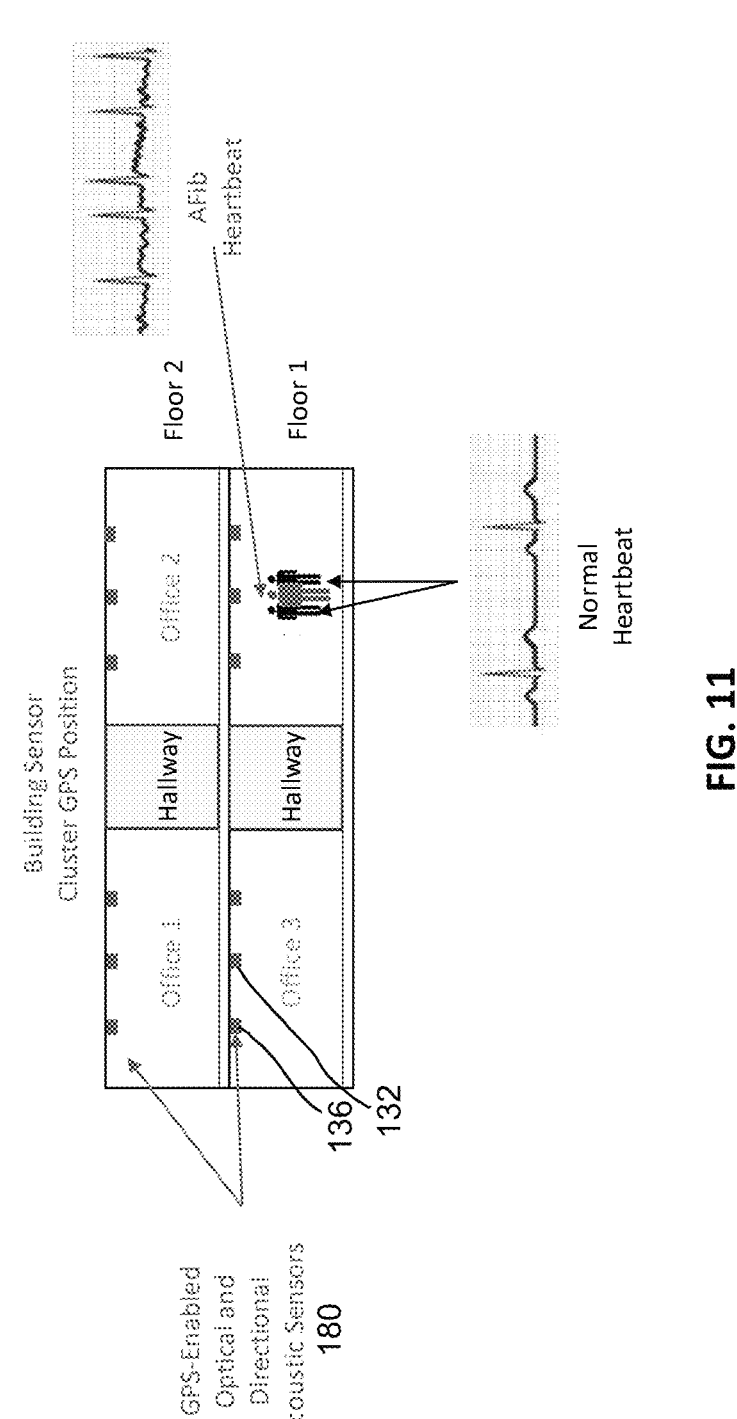
FIG. 11 shows a diagram of acoustic sensors used in determining the position of an atrial fibrillation (AFib) distress victim in an arbitrary room of a building, in accordance with embodiments of the present invention.

FIG. 11 shows a diagram 250 depicting the detection of someone having heartbeat problems, identification of the type of heartbeat problem (e.g., atrial fibrillation (AFib), in this case) and identification of the occupant in medical distress even in a group of occupants. The specific medical distress identification is accomplished using the acoustic signature detected by computer-controlled, gimbaled, directional microphones 136 of sufficient quality, occupant identification using optical sensors, and occupant location using the GPS-enabled sensor cluster 252. In the data analysis software component of the human-centric smart building server, data from the directional microphone and a database of heartbeat patterns accessed using convolutional neural networks (CNNs) are used to identify the correct medical distress type. Data from optical sensors 132, face recognition software, and a database of current occupant faces are used to identify the occupant. Data from the GPS-enabled sensor clusters 180 and angular data from the directional microphone 136 are used to calculate by triangulation the location of the occupant in distress. Alternatively, GPS coordinate data from the occupant's mobile device can be used to determine the occupant's location.

Figure 12:
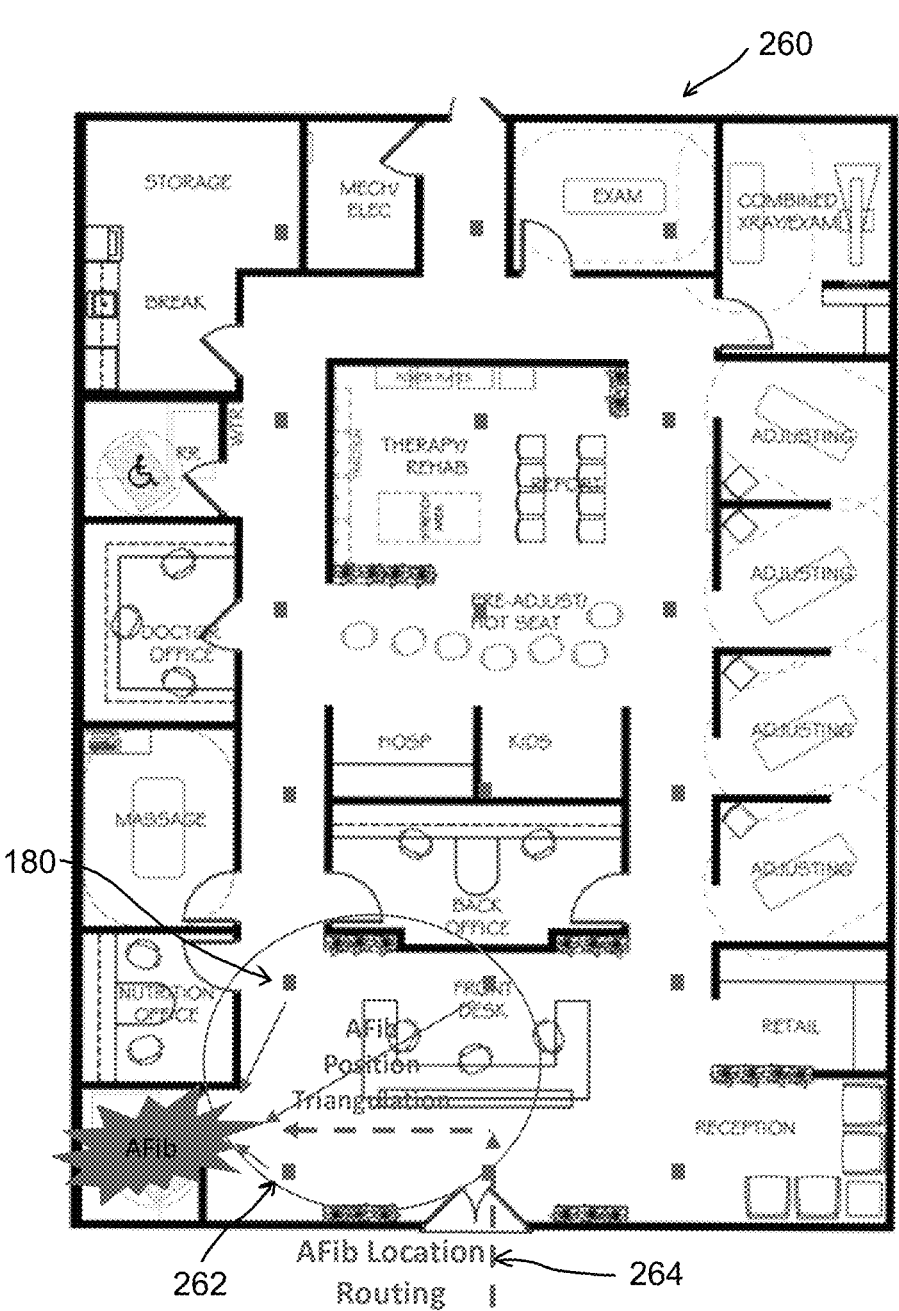
FIG. 12 shows a diagram of routing emergency responders to an AFib victim in an arbitrary room of a building, in accordance with embodiments of the present invention.

FIG. 12 shows a diagram 260 depicting the detection of an occupant experiencing AFib, using an array of clustered sensors 180. Acoustic triangulation 262 is used to identify the location of the occupant experiencing AFib. Using the human-centric smart building mobile device application 106a, a first responder can request routing 264 to the location of the occupant in medical distress. The routing 264 is calculated in the tracking and routing components 140, 142 of the human-centric smart building server.

Figure 13:
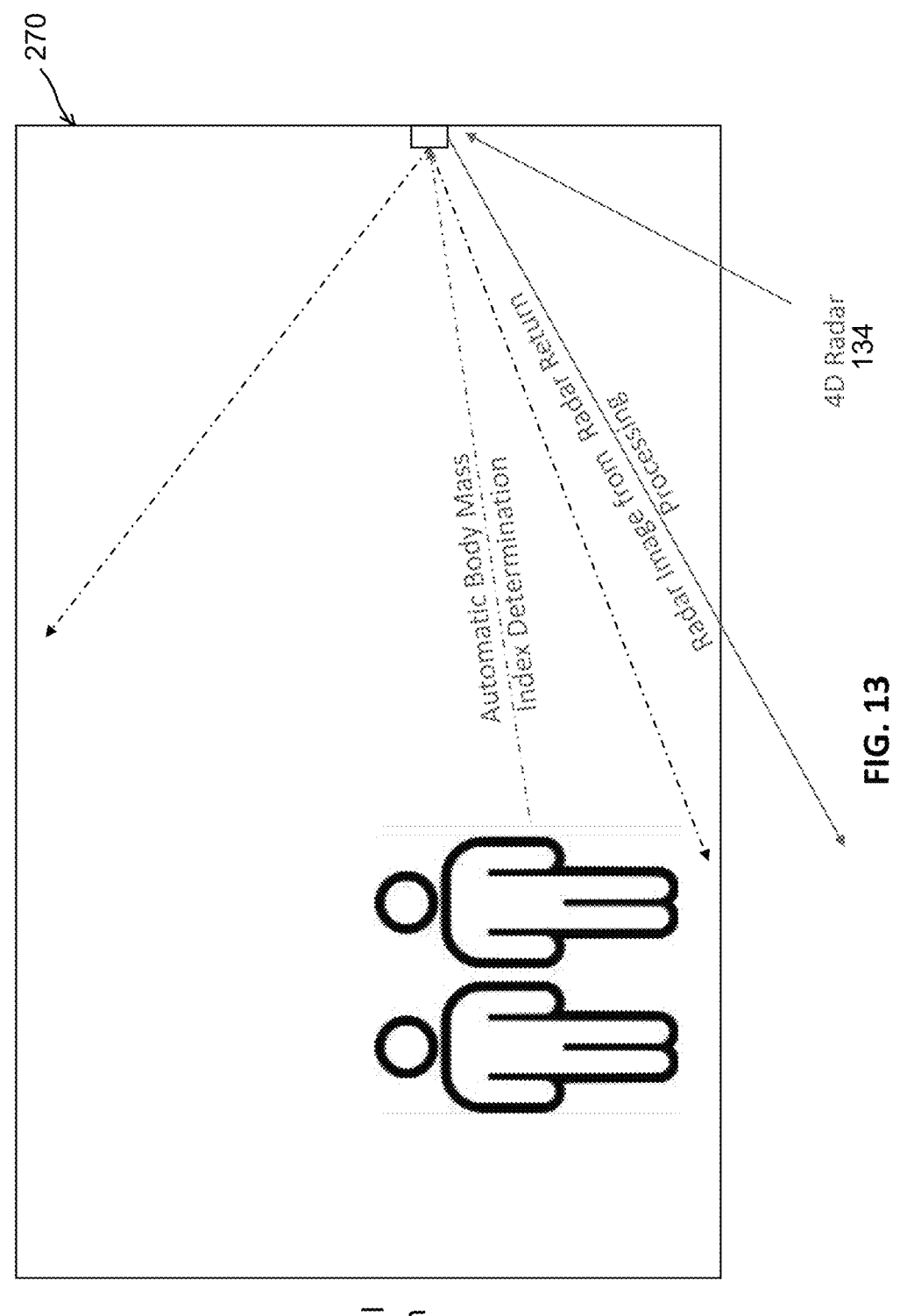
FIG. 13 shows a diagram of 4D radar in an arbitrary room of a building automatically detecting and calculating the body mass index of building occupants, in accordance with embodiments of the present invention.

FIG. 13 shows a diagram 270 depicting the use of a fixed position 4D radar 134 to automatically calculate the body mass index (BMI) of occupants, upon request. This data can be used as part of a health diagnostic or athletic conditioning regime for regular occupants, such as those who work in the building or facility. This data can also be used in hospitals, triage areas, and other medical-related facilities.

Figure 14:
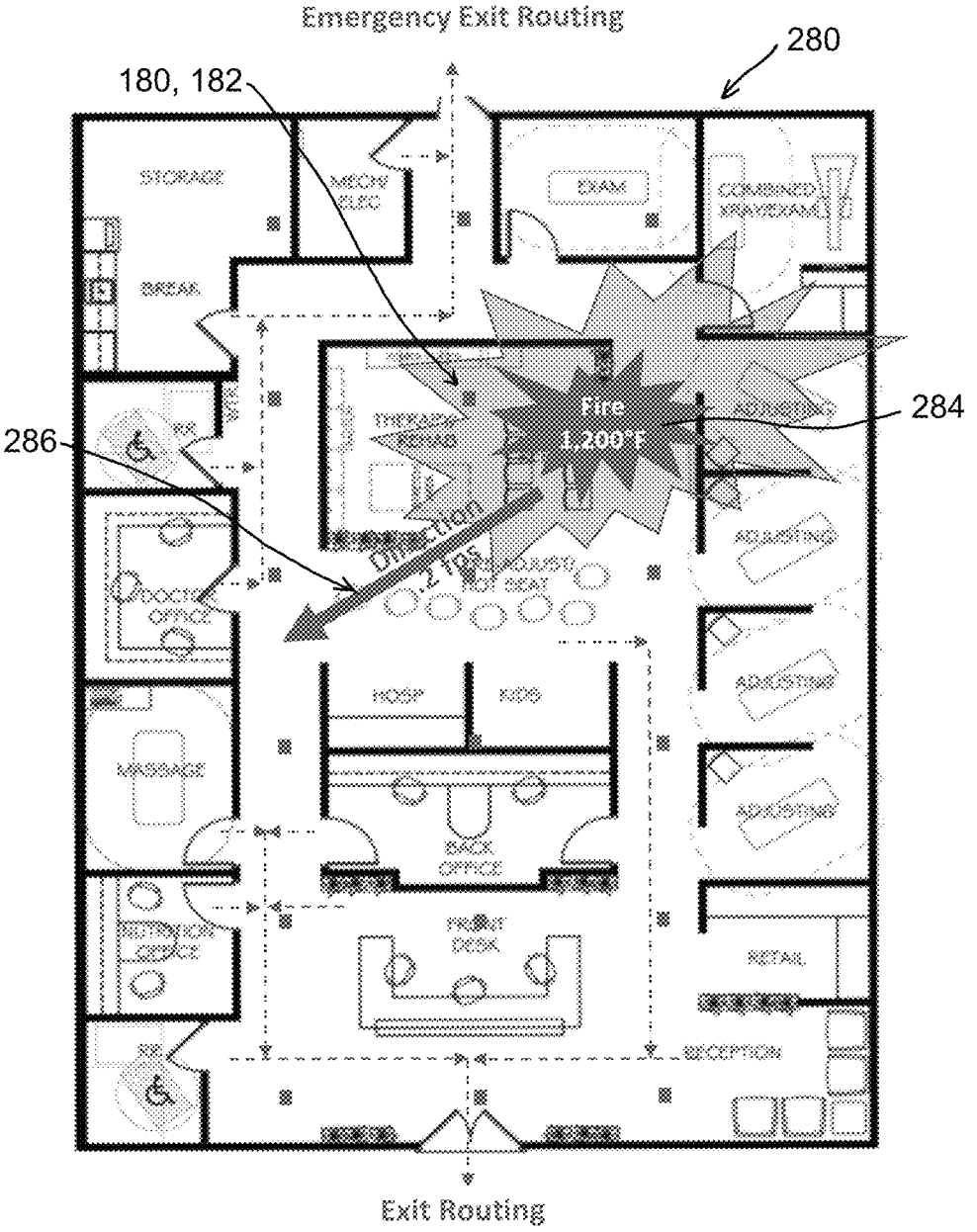
FIG. 14 shows a diagram of the location of a fire detected by an array of infrared sensors and the automatic emergency routing of personnel to a safe exit location via safe routes, in accordance with embodiments of the present invention.

FIG. 14 shows a diagram 280 of an example fire event detected using an array of sensor clusters 180, 182 comprising infrared sensors 132. Using the detected temperature gradient data from multiple sensor cluster(s) over time, it is possible to determine a fire's temperature 284, change in temperature, direction(s) of growth 286, change in direction(s) of growth, rate(s) of growth, and change in rate(s) of growth. This provides enough data, along with occupant location data, for the system 100 to automatically generate customized safe exit routing per occupant as well as re-routing as needed, based on speed of the occupant and the speed and direction of the fire. As sensor clusters 180, 182 stop responding, the location of those sensors is deemed automatically unsafe.

Figure 15:
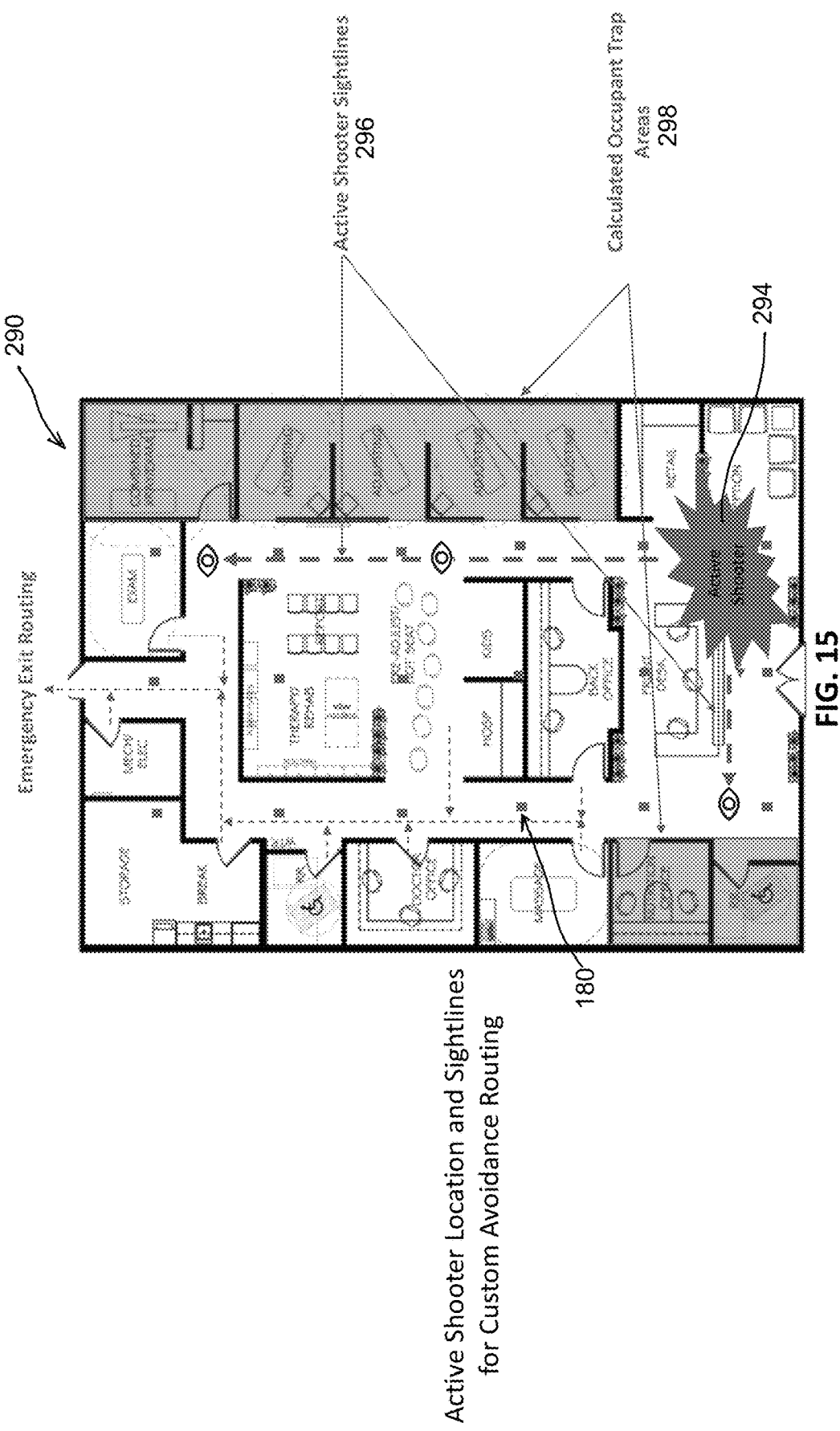
FIG. 15 shows a diagram of the detection and location of an active shooter, the safe routing of occupants around the shooter's sightlines, and the identification of trap areas with no exit pathway without crossing the active shooter's sightline, in accordance with embodiments of the present invention.

FIG. 15 shows a diagram 290 example of gunshot detection using an array of sensor clusters 180, including omni-directional acoustic microphones 136. Not only is the position of the shooter 294 detected but their sightlines 296 are automatically calculated using maps of the building and the shooter location. Calculating a shooter's sightlines allows the system 100 to determine not only safe routes away from the shooter but also areas that have no safe routes around the shooter's sightlines 296, called trapped areas 298. Since the location of the shooter 294 can be determined acoustically, if that location is correlated with an optical sensor 132, then the active shooter's location can be automatically tracked. By tracking the active shooter, potential escape routes can be determined, giving additional data to first responders.

The use of directional acoustic sensors 136 that can detect heartbeats and breathing patterns gives additional data to first responders, both law enforcement and medical, about the physical state of both the shooter 294 and any actual or potential victims.

Figure 16:
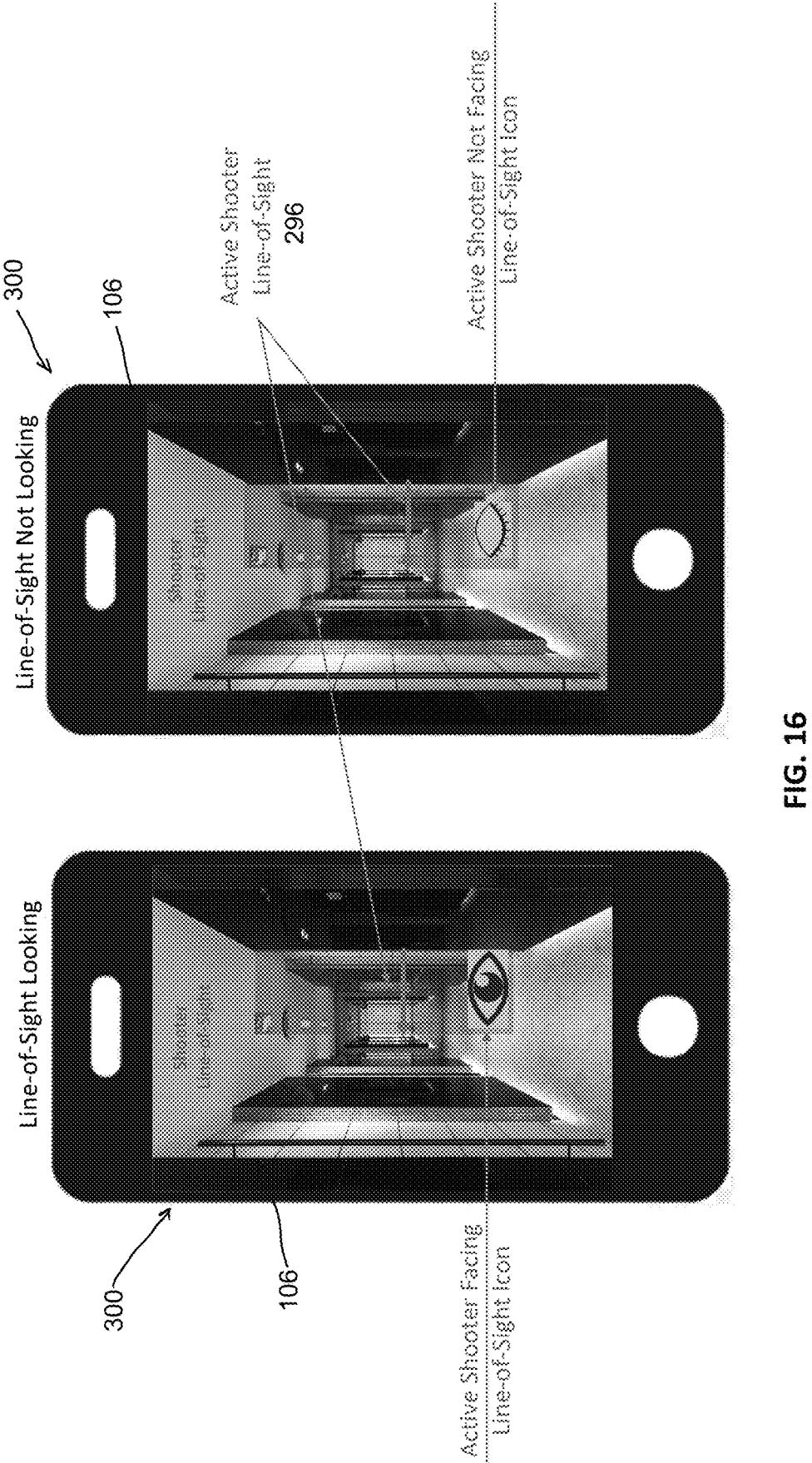
FIG. 16 shows an augmented reality view of an active shooter's line-of-sight along with an icon depicting whether or not the active shooter is looking in the direction indicated by the line-of-sight designation, in accordance with embodiments of the present invention.

FIG. 16 shows images 300 of an augmented reality display on a mobile device 106 indicating the existence of a sightline 296 from an active shooter 294. By using augmented reality, bypassing sightlines can be assured with no possibility of confusion as to what might occur with the map display of sightlines 296.

Figure 17:
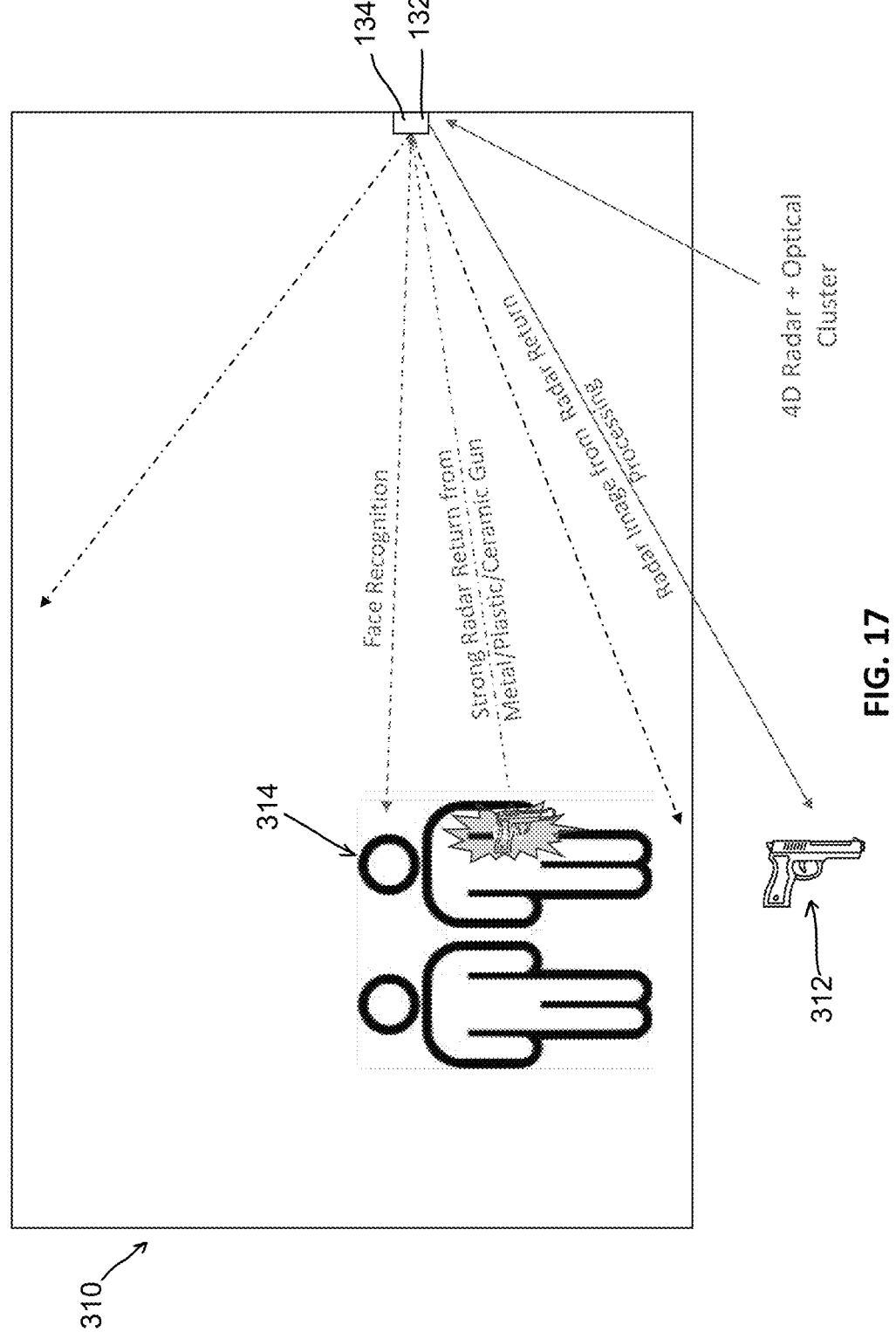
FIG. 17 shows a diagram of 4D radar in an arbitrary room of a building automatically detecting and identifying a hidden gun on an occupant, in accordance with embodiments of the present invention.

FIG. 17 shows a diagram 310 depicting the use of a fixed position 4D radar 134 in the detection of weapons 312 on an occupant 314. This can be used instead of, or in conjunction with, a traditional metal detector system. Since 4D radars 134 are imaging radars, an image of the weapon is generated. Using object recognition software with the image generated from the 4D radar 134, nonferrous weapons can be detected, including ceramic knives and 3D printed guns.

Figure 18:
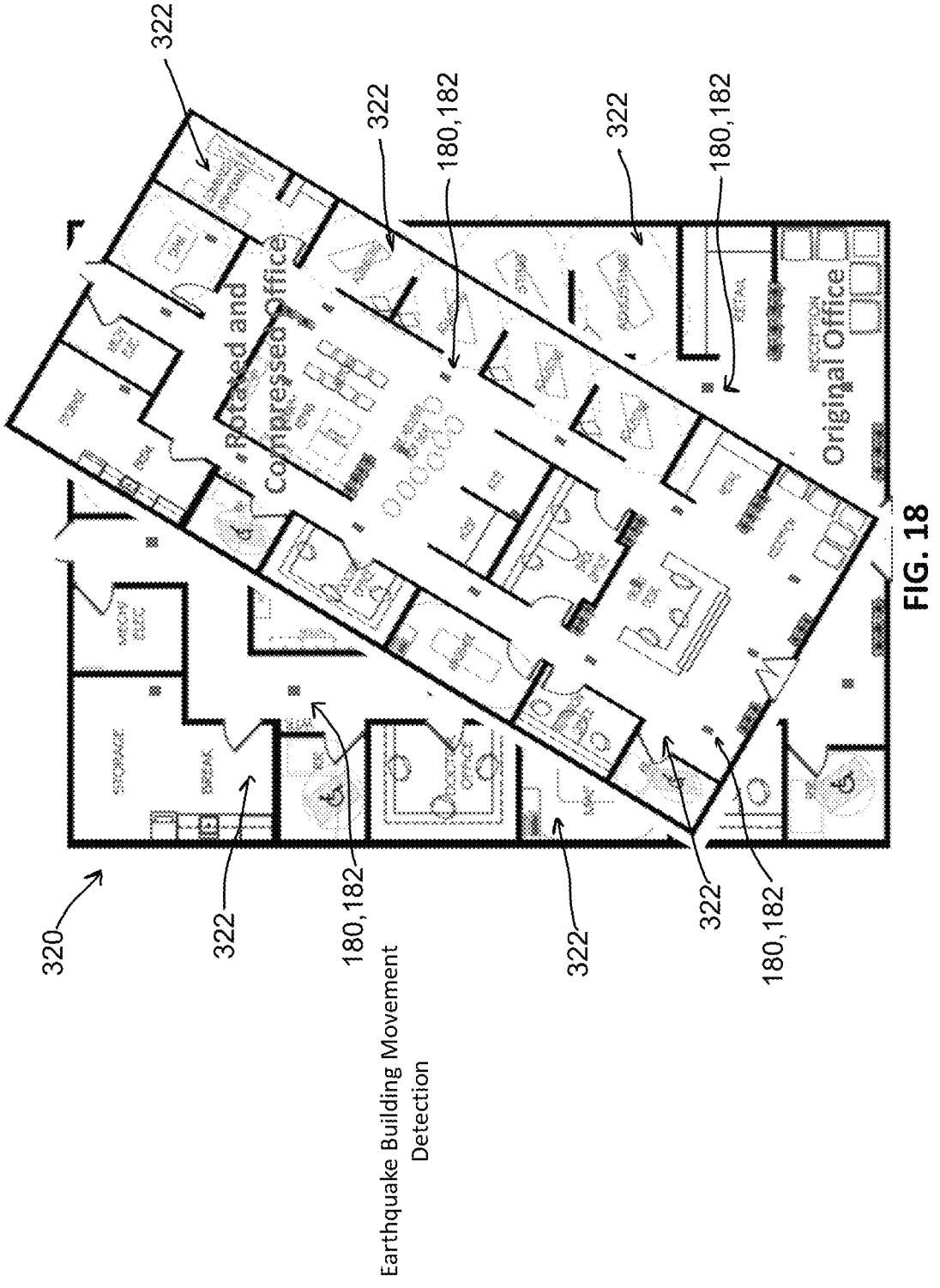
FIG. 18 shows a diagram of the change in sensor location from building rotation and compression, in accordance with embodiments of the present invention.

FIG. 18 shows a diagram 320 depicting the detection of rotated building room locations 322 by using the GPS coordinate changes for the employed array of sensor clusters 180, 182, giving data on the structural integrity and positioning (e.g., shifting, directional/positional movement, etc.) of various parts of a building after explosions, earthquakes, landslides, tornados, windstorms, hurricane events, and the like.

Figure 19:
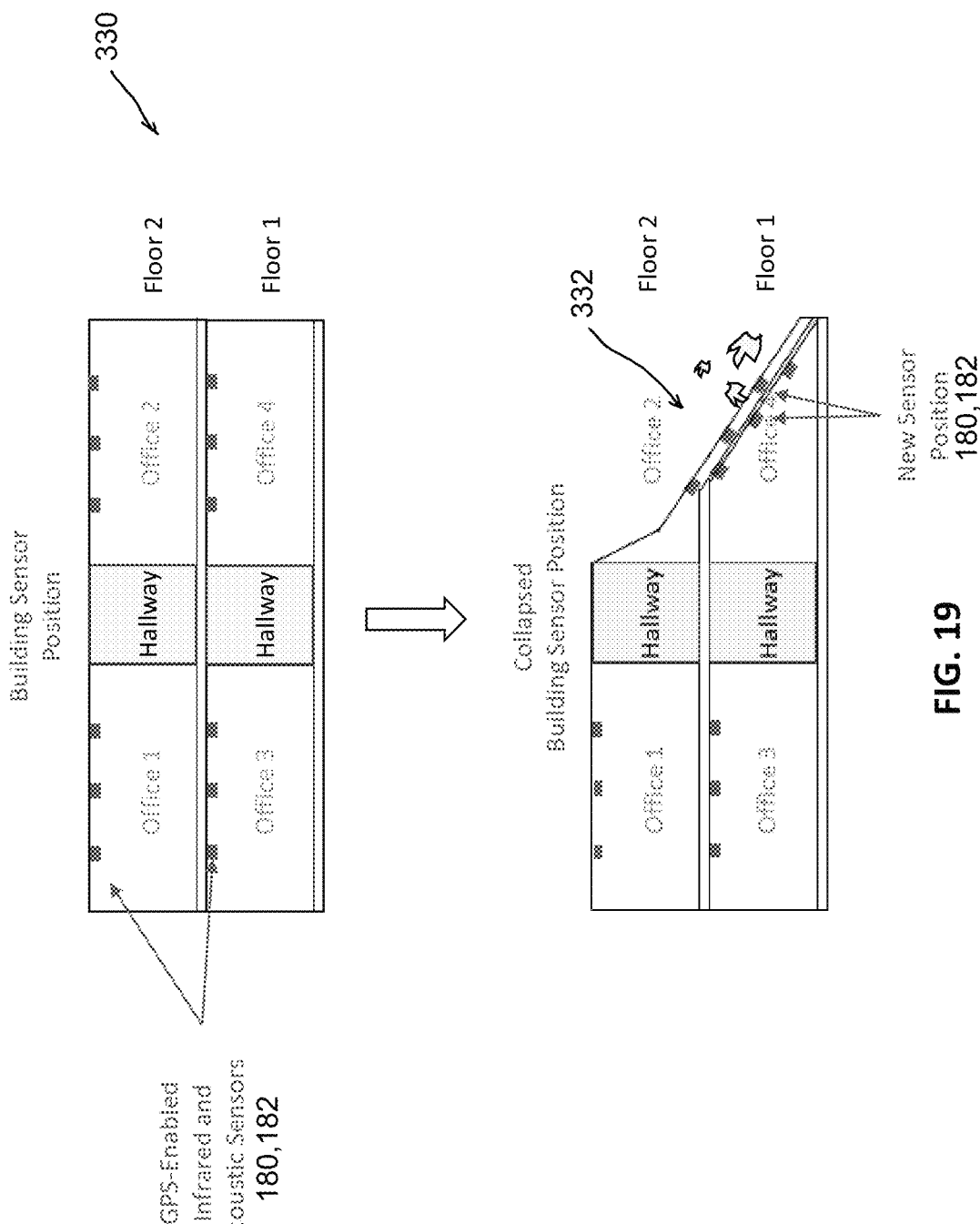
FIG. 19 shows a diagram of the change in sensor location from the collapse of part of a building, in accordance with embodiments of the present invention.

FIG. 19 shows a diagram 330 depicting the detection of voids 332 after a full or partial building collapse using the GPS coordinate changes in the implemented array of sensor clusters 180, 182 (e.g., infrared sensors 132 and acoustic sensors 136). The location and volume of found voids 332 can be used to focus rescue efforts. Any acoustic sensor data from the array of sensor clusters 180, 182 can be used to further isolate the location of survivors in full or partial building collapses.

Figure 20:
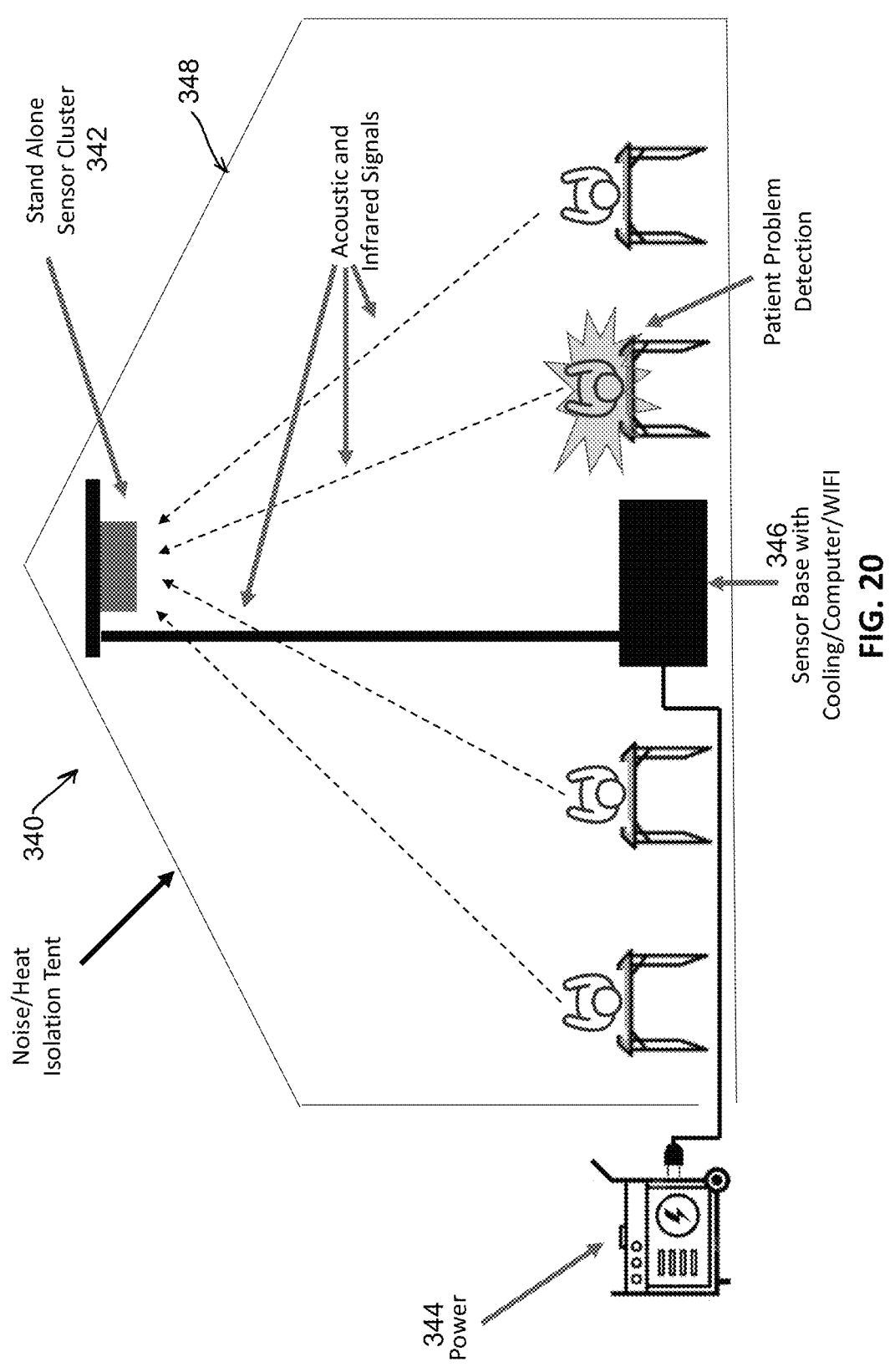
FIG. 20 shows a diagram of a sensor cluster as part of a transportable patient monitoring system, in accordance with embodiments of the present invention.

FIG. 20 shows a diagram 340 depicting the use of a single cluster sensor 342 attached to portable power 344, and cooling and computing resources 346, in the monitoring of patients in a field hospital setting. As shown, a temperature—and sound—isolating tent 348 encloses both the patients and the sensor cluster 342. Heartbeats and respiration are monitored without direct attachment to the system 100. A local or wide area (depending on power availability) network would allow the monitoring data to be presented to mobile devices in the field. Attached satellite mobile devices would give internet access allowing for remote medical consultation. Such a remote system is inherently scalable as adding new beds is as easy as adding new tents 348 and is cost effective as it can be easily moved when and where needed without the need of traditional infrastructure and its attendant costs. Such a system is a personnel multiplier as a single person can monitor dozens of patients, focusing on those who have the most direct need.

Figure 21:
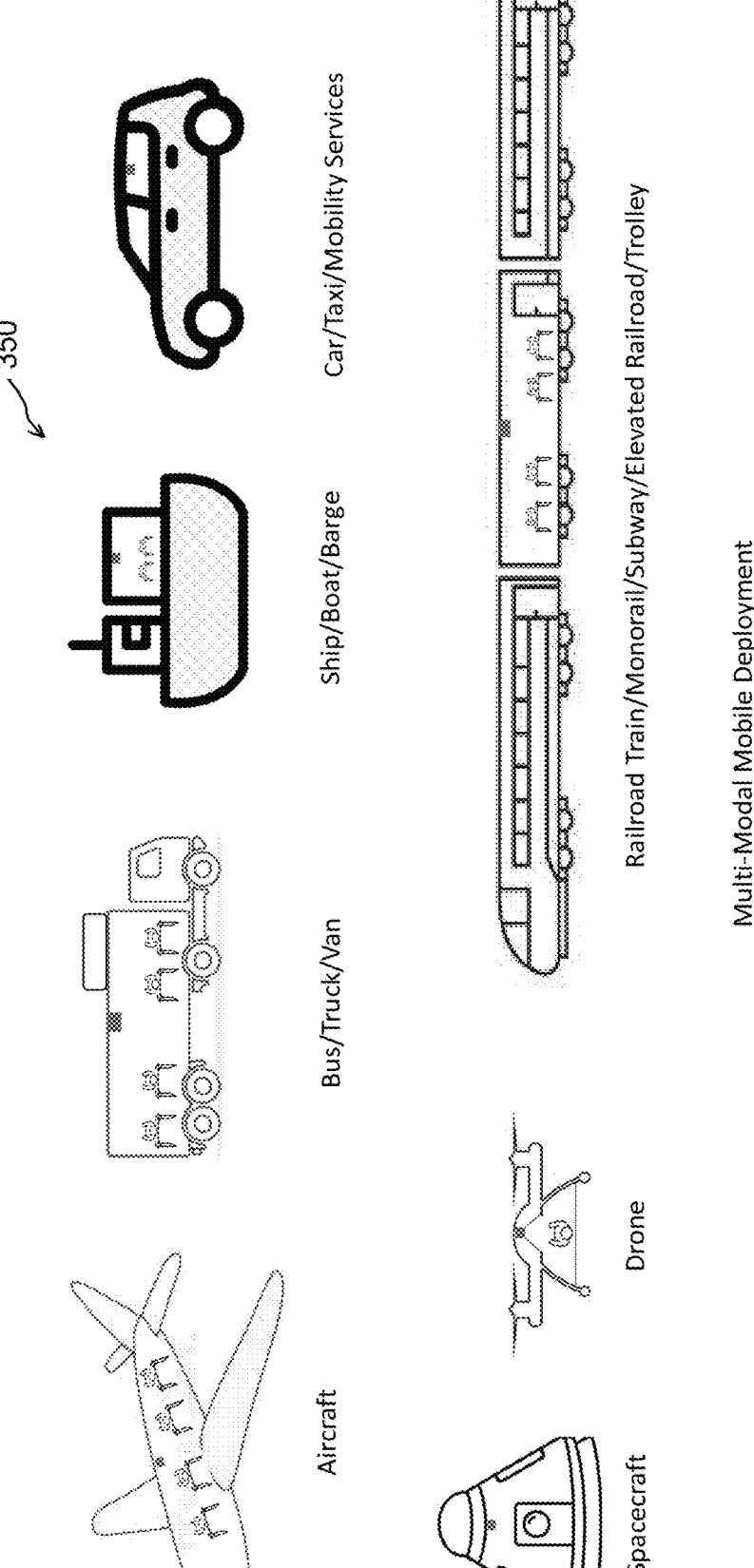
FIG. 21 shows a diagram of the multi-modal aspects of the transportable patient monitoring systems, in accordance with embodiments of the present invention.

FIG. 21 shows a diagram 350 depicting multiple deployment embodiments for the patient field hospital system. These embodiments can include aircraft, spacecraft, busses, trucks, vans, ships, boats, barges, cars or vehicles, taxis, mobility services, railroad trains, monorails, subways, elevated railroads, trolleys, and the like.

Human-Centric Smart Building Core Concepts

Human-centric smart building concepts give a commercial, private, or public building the ability to nurture, protect, and assist humans in their day-to-day activities while within the building. Prior art attempts at smart building technologies concentrate on environmental issues like temperature, lighting, humidity, and $CO_2$ levels. Although these are important for human comfort, they do not nurture, protect, and assist humans in any meaningful way. Nurturing, protection, and assistance systems can be used as smart building concepts.

One fact that current or conventional smart building concepts fail to take advantage of is the current use of smart phones by adult Americans, which, according to US Smart Phone Industry statistics, has been steadily growing and as of 2021, stands at eighty-five percent. For younger Americans (ages 19 to 29), the rate is even higher at ninety-six percent. According to smart phone industry statistics, the average smart phone user interacts with their phone about one hundred times per day. This means that the best interface between a smart building and its occupants can be through their smart phones and/or smart wearables. Most building interaction today is through signage, human-occupied front desks, and fixed video presentation areas. The system and methods of the current invention offer a new interface between an occupant and a commercial, private, or public building's services.

Nurturing

A nurturing system would enhance the wellbeing or capabilities of the occupants of a building. A building can be equipped with associated sensors and a map of all floors of a building can be automatically downloaded to the smart phone of an occupant. Using a human-centric smart building application, it is possible for the system 100 to generate either the closest route to a building service or optional routes to provide the maximum exercise to the occupant. If the building sensors can detect and track heart and breathing rates, it can monitor the amount of exercise and fitness level changes for an occupant over time, without the need for any additional equipment or software application. The fitness data is preserved and can be used in different human-centric smart buildings. Signups, reminders, and routings for scheduled self-improvement opportunities is a nurturing capability of the human-centric smart building application of the system 100. If the occupant is in another smart building with the same activity provided, they can continue their self-improvement regardless of the site.

Protection

Although conventional systems can provide piecemeal protection solutions, there is no over-arching, integrated model of protection for occupants as included with the system 100 of the present invention.

Although most commercial and public buildings have a fire detection and/or fire detection and suppression system, providing occupants with a building exit route that minimizes their interaction with the fire is not provided. Since the human-centric smart building system 100 can use an array of sensors (e.g., infrared sensors) and triangulation software to determine the location as well as the temperature, direction, and rate of growth of a fire, a customized building exit strategy for each occupant is provided on their associated smart phone.

There are currently gunshot detection systems available to buildings. However, the human-centric smart building system 100 uses an array of acoustic and optical sensors, and triangulation software, to automatically determine the active shooter's location, obtain an image of the shooter, and track their location changes. The system 100 also can automatically determine the sightlines of the shooter and provide dynamic, real-time, shooter avoidance and safe building exiting routing. First responders can be efficiently routed to the location of active shooters while avoiding their sightlines.

In today's world, metal detectors might not be enough to detect weapons on those entering a building since 3D printers can make low-metallic guns and knives. Fortunately, 4D radars, because of their use in the auto industry, have become inexpensive and available. These are imaging radars and can easily distinguish dense objects like ceramic knives and 3D printed guns. Using 4D radars discreetly placed at building entrances allows the system 100 to detect and categorize weapons.

In some parts of the country, earthquakes or rapidly developing sink holes are issues for buildings. Given sensor clusters, each with a GPS chip, it is possible for the system 100 to determine the location of any partial building collapse and to automatically route occupants around those collapsed areas. Detection is possible when the location of sensors shifts as the ceiling shifts. Any detected voids in collapsed portions of a building with detected heartbeats and/or breathing is used to route first responders to the trapped occupants.

Since modern acoustic sensors can detect human heartbeats and breathing from tens of feet, it is now possible for sensors in a building to detect the occurrence of various occupant cardiac or respiratory events. Using recurrent neural networks (RNNs), convolutional neural networks (CNNs), transformer-based networks, or bidirectional encoder representations from transformers (BERT), it is possible to construct the mathematical relationship between the acoustic signals and various cardiac or respiratory event models. Triangulation of multiple acoustic sensors to the same event gives the location of the occupant experiencing the detectable event.

New chip-based 4D radar sensors that can detect distance, velocity, elevation, and angle from small, difficult-to-detect particles can also be used to detect cardiac and respiratory events. Using 4D radar eliminates the need to perform triangulation for medical event location determination. Once a building system 100 has detected a potential medical problem, it can alert the occupant and/or building personnel. First responders can be automatically routed to the location of the occupant experiencing the detectable event.

Assistance

Finding the location and availability of building services and providing routing to the requested building service is not part of conventional smart building concepts. Using an occupant's smart phone as an interface to the smart building's services, including service type, service location, service capacity and service availability allows the building itself to assist an occupant. There are three types of building routing assistance for the system 100: simple, semi-complex, and complex.

A simple routing assistance routes an occupant from one location of the current building to some other building location, without taking into consideration the number of instances of that building service, its capacity or availability. If the occupant wished to go to a specific office in an office building, the simplest route is provided via their smart phone.

A semi-complex building routing uses additional data, such as the number of instances of a building service, its capacity and availability. There are two types of building services, fixed and movable, and a building service can have a single or multiple instances.

When a single instance building service is requested, the system 100 of the building first determines its availability based on the service's capacity, and with the aid of sensors, its utilization. Many sensor types can be used to determine utilization including weight sensors, door entry/exit sensors, or cameras detecting the number of occupants in an area. A building service that has more than one instance requires the selection of the instance that the occupant is routed to. Typically, the building service instance that is the closest to the requesting occupant is the initial choice. If the closest instance is determined by the building to be at capacity, then the utilization of the next closest building service instance is determined. The occupant is routed to the closest building service instance that has availability. An occupant is automatically re-routed if a closer building service instance becomes available.

Examples of multi-instance fixed building services include drinking fountains, restrooms, concession stands, conference rooms, fixed seating, and the like. For fixed building services, the location, capacity, access restrictions, and type of each service is input into a database of building services.

Examples of multi-instance movable building services include movable alcohol or food bars, seats, partitions, tables, kiosks, podiums, bleachers, and the like. These types of movable building services require additional data such as size and orientation to ensure appropriate and useful placement in new locations. This additional data can be entered into a database manually. However, the actual orientation of the movable building service requires dynamically generated real-time information, using multiple RFID tags strategically placed on each movable service. Room layout software allows building personnel to, on a display/computer screen, determine the layout of a room, including the positioning of movable building services. Since the size, position, and orientation of movable building services can be automatically tracked, the system 100 itself can automatically verify the proper placement and orientation of such services without the need for direct human verification.

Complex building routing assistance can include additional data, including out-of-building factors such as time limits and permissions for building, floor, or room access, firefighting equipment, and wireless transmission access required to generate routing for an occupant.

Movable Sensor Clusters for Expanded Capability

As detailed herein, an array of sensor clusters of the system 100 of the present invention can be used to detect various cardiac and respiratory events. If the sensor cluster is connected to a computer system for processing, using a stand-alone server, cloud-computing, network-based servers, or the sensor cluster itself contains compute capability, using stand-alone, peer-to-peer or ad hoc processing, then the diagnostic capability of these buildings can be expanded to provide medical supervision for remote locations, using tents, aircraft, spacecraft, drones, cars, taxis, mobility services (like Lyft or Uber), buses, trucks, vans, ships, boats, barges, railroad trains, monorails, subways, elevated railroads, trolleys, etc. In addition, being in an enclosed area is analogous to being in a building; therefore, many of the same human-centric smart building services provided to building occupants can also be provided in other settings.

Stand-alone versions of sensor clusters can be placed on multiple forms of transportation such as aircraft, spacecraft, railroad trains, and the like, allowing for detection of cardiac or respiratory medical distress and the rapid routing of trained personnel where needed. Untrained occupants can be routed to medical services and first aid supplies when trained personnel are not available. The human-centric smart system application for an expanded definition of "building" can also be used for automatic, customized hazard avoidance and safe exit routing of occupants in case of a fire or active shooter.

Autonomous or semi-autonomous vehicles can interact with the system 100 described herein to detect medical distress, instructing the vehicle to safely pull over and stop (in the case of semi-autonomous vehicles) or re-route the vehicle to the nearest medical care center while calling ahead (in the case of fully autonomous vehicles). Alternatively, first responders can be given preliminary information and automatically routed to the location of the vehicle containing the occupant in distress.

Mobile triage or medical monitoring can be provided by bus, truck, or van. In rural areas, this can act as the bridging technology, providing medical services to rural areas.

While various embodiments of the system 100 have been described above and herein, it should be understood that they have been presented by way of example only, and not limitation. Thus, the breadth and scope of the present disclosure should not be limited by any of the above-described embodiments or examples. Moreover, any combination of the above-described elements and all possible variations thereof is encompassed by the disclosure unless otherwise indicated herein or otherwise clearly contradicted by context.

Various devices or computing systems can be included and adapted to process and carry out the aspects, computations, and algorithmic processing of the software systems and methods of the present invention. Computing systems, devices, or appliances of the present invention may include a computer system, smart or mobile phone device, wearable device, tablet device, and the like, which may include one or more microprocessors, one or more processing cores, and/or one or more circuits, such as an application-specific integrated circuit (ASIC), field-programmable gate arrays (FPGAs), graphics processing units (GPU), general purpose graphics processing units (GPGPU), etc. Any such device or computing system is a processing element herein. A server or cloud processing system for use by or connected with the systems of the present invention may include a processor, which may include one or more processing elements. Further, the devices can include a network interface or a bus system in cases where the processing elements are within the same chip. The network interface is configured to enable communication with a communication network, other devices and systems, and servers, using a wired and/or wireless connection.

The devices or computing systems may include memory, such as non-transitive, which may include one or more non-volatile storage devices and/or one or more volatile storage devices (e.g., random access memory (RAM)). In instances where the devices include a microprocessor, computer-readable program code may be stored in a computer-readable medium or memory, such as but not limited to magnetic media (e.g., a hard disk), optical media (e.g., an OVO), memory devices (e.g., random access memory, flash memory), etc. The computer program or software code can be stored on a tangible, or non-transitive, machine-readable medium or memory. In some embodiments, computer-readable program code is configured such that when executed by a processing element, the code causes the device to perform the steps described above and herein. In other embodiments, the device is configured to perform steps described herein without the need for code.

It will be recognized by one skilled in the art that these operations, algorithms, logic, method steps, routines, sub-routines, components, and modules may be implemented in software, in firmware, in special purpose digital logic, and any combination thereof without deviating from the spirit and scope of the present invention as recited within the claims attached hereto.

The devices, appliances, or computing devices may include an input device. The input device is configured to receive an input from either a user (e.g., admin, user, etc.) or a hardware or software component as disclosed herein in connection with the various user interface or automatic data inputs. Examples of an input device include data ports, keyboards, a mouse, a microphone, scanners, sensors, touch screens, game controllers, and software enabling interaction with a touch screen, etc. The devices can also include an output device. Examples of output devices include monitors, televisions, mobile device screens, tablet screens, speakers, remote screens, screen less 3D displays, data ports, HUDs, etc. An output device can be configured to display images, media files, text, or video, or play audio to a user through speaker output.

The term communication network includes one or more networks such as a data network, wireless network, a telephony network, or any combination thereof. It is contemplated that the data network may be any local area network (LAN), metropolitan area network (MAN), wide area network (WAN), the internet, cloud computing platform, or any other suitable packet-switched network, such as a commercially owned, proprietary packet-switched network, e.g., a proprietary cable or fiber-optic network. In addition, the wireless network may be, for example, a cellular network and may employ various technologies including global system for mobile communications (GSM), internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WIFI), satellite, mobile ad-hoc network (MANET), and the like.

While various embodiments have been described above, it should be understood that they have been presented by way of example only, and not limitation. Thus, the breadth and scope of the present disclosure should not be limited by any on the above-described embodiments or examples. Moreover, any combination of the above-described elements in all possible variations thereof is encompassed by the disclosure unless otherwise indicated herein or otherwise clearly contradicted by context.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

While the present invention has been described in connection with various aspects and examples, it will be understood that the present invention is capable of further modifications. This application is intended to cover any variations, uses or adaptation of the invention following, in general, the principles of the invention, and including such departures from the present disclosure as come within the known and customary practice within the art to which the invention pertains.

It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of 35 U.S.C. § 112 (f) are not to be invoked unless the specific terms "means for" or "step for" are recited in a claim.

What is claimed is:

1. A human-centric smart building system, comprising:
   at least one sensor cluster array including a plurality of building-placed sensors configured to detect, parallel process, and transmit sensor-detected event data;
   one or more mobile devices; and
   one or more computing servers in operative communication with the one or more mobile devices and the at least one sensor cluster array, wherein the sensor-detected event data is parallel processed using combined computational resources of the plurality of building-placed sensors of the at least one sensor cluster array for transmission of cluster processed sensor-detected event data to the one or more computing servers, and wherein the one or more computing servers receive the cluster processed sensor-detected event data via multiple data streams from the at least one sensor cluster array to further process occupant information and identify an occupant event, with the occupant information including at least occupant location data and occupant status data.

2. The system of claim 1, wherein the one or more mobile devices comprise one or more smart phone devices.

3. The system of claim 1, wherein the one or more computing servers comprise one or more cloud-computing servers.

4. The system of claim 2, wherein parallel processing is further performed using combined computational resources of the one or more mobile devices.

5. The system of claim 1, wherein the occupant location data comprises data indicating a direction an occupant is facing.

6. The system of claim 5, wherein at least one of the plurality of building-placed sensors comprises a Global Positioning System (GPS) device and the occupant location data further comprises GPS-based occupant location data.

7. The system of claim 1, wherein the plurality of building-placed sensors comprise a plurality of optical or infrared sensors.

8. The system of claim 1, wherein the plurality of building-placed sensors comprise a plurality of acoustic sensors.

9. The system of claim 1, wherein the plurality of building-placed sensors comprise a plurality of 4D radar sensors.

10. The system of claim 1, wherein the occupant event comprises an occupant medical event.

11. The system of claim 1, wherein the occupant event comprises a fire event.

12. The system of claim 1, wherein the occupant event comprises an optical or infrared event, an omni-directional acoustic event, a directional acoustic event, a 4D radar event, and/or a Radio Frequency Identification (RFID) event.

13. The system of claim 1, wherein the cluster processed sensor-detected event data received via the multiple data streams is processed to triangulate a location of at least one occupant.

14. A human-centric smart building monitoring method, comprising:

providing at least one sensor cluster array including a plurality of building-placed sensors configured to detect, parallel process, and transmit sensor-detected event data;

monitoring the plurality of building-placed sensors of the at least one sensor cluster array for the sensor-detected event data;

parallel processing the sensor-detected event data using combined computational resources of the plurality of building-placed sensors of the at least one sensor cluster array for transmission of cluster processed sensor-detected event data;

receiving the cluster processed sensor-detected event data via multiple data streams from the at least one sensor cluster array to process occupant information at one or more computing servers; and identifying an occupant event based on the processing of the occupant information, wherein the occupant information includes at least occupant location data and occupant status data.

15. The method of claim 14, wherein one or more mobile devices are in operative communication with the one or more computing servers and the plurality of building-placed sensors.

16. The method of claim 14, wherein the one or more computing servers comprise one or more cloud-computing servers.

17. The method of claim 15, wherein parallel processing is further performed using combined computational resources of the one or more mobile devices.

18. The method of claim 14, wherein the occupant location data comprises data indicating a direction an occupant is facing.

19. The method of claim 14, wherein at least one of the plurality of building-placed sensors comprises a Global Positioning System (GPS) device and the occupant location data further comprises GPS-based occupant location data.

20. The method of claim 14, wherein the plurality of building-placed sensors comprise a plurality of optical or infrared sensors, a plurality of acoustic sensors, or a plurality of 4D radar sensors.

21. The method of claim 14, wherein the occupant event comprises an occupant medical event or a fire event.

22. The method of claim 14, wherein the sensor-detected event data is processed to triangulate a location of at least one occupant.

\* \* \* \* \*